United States Patent [19]

Black et al.

[11] Patent Number: 5,740,234
[45] Date of Patent: Apr. 14, 1998

[54] TELEPHONE CALL MONITORING METHOD AND APPARATUS

[75] Inventors: James Edward Black, Galena; Bret Allen Cooper, Columbus, both of Ohio; Brian Dean Freeman, Howell, N.J.; Donald M. Gerth, Dublin; Richard D. Jordan, Columbus, both of Ohio; Steven Todd Kaish, Bridgewater, N.J.; Yogeesh H. Kamath, Gahanna, Ohio; Paul G. Sherry, Pickerington, Ohio; Ruth E. Smilan, Westerville, Ohio; Ronald W. Tamkin, Pataskala, Ohio; Neng H. Wang, Tinton Falls; Alex Cherry Wilkinson, Princeton Junction, both of N.J.

[73] Assignee: AT&T Corp., Middletown, N.J.

[21] Appl. No.: 953,040

[22] Filed: Sep. 29, 1992

[51] Int. Cl.⁶ .................... H04M 15/00; H04M 3/42
[52] U.S. Cl. .................... 379/115; 379/113; 379/133; 379/134; 379/207
[58] Field of Search .................... 379/111, 112, 379/113, 115, 116, 119, 126, 127, 133, 134, 135, 136, 139, 201, 207, 211, 265, 266

[56] References Cited

U.S. PATENT DOCUMENTS

| 4,191,860 | 3/1980 | Weber | 379/115 |
|---|---|---|---|
| 4,348,554 | 9/1982 | Asmuth | 379/113 |
| 4,757,267 | 7/1988 | Riskin | 379/113 |
| 4,788,718 | 11/1988 | McNabb et al. | 379/113 |
| 4,953,204 | 8/1990 | Cushleg, Jr. et al. | 379/266 |
| 5,095,505 | 3/1992 | Finucane et al. | 379/127 |
| 5,136,636 | 8/1992 | Wegrzynowicz | 379/207 |
| 5,164,983 | 11/1992 | Brown | 379/112 |
| 5,230,017 | 7/1993 | Alexander | 379/113 |
| 5,253,288 | 10/1993 | Frey et al. | 379/201 |
| 5,282,243 | 1/1994 | Dabbaghi et al. | 379/211 |

OTHER PUBLICATIONS

"AT&T 800 Call Attempt Profile" AT&T customer information, 1983.

"AT&T 800 Call Attempt Profile" AT&T sales force information, 1983.

"AT&T Advanced 800 Service Call Attempt Profile" AT&T customer information, 1985.

"ASQIC 800 Call Data Master" AT&T Technical Journal, May/Jun., 1987, vol. 66, Issue 3, p. 21.

"Data Collection Services" Interface Specifications Between Central System and Workstation AT&T technical reference, Apr., 1991.

*Primary Examiner*—Curtis Kuntz
*Assistant Examiner*—Vijay Shankar
*Attorney, Agent, or Firm*—Barry H. Freedman

[57] ABSTRACT

To provide a complete picture of the calling pattern of calls placed to a destination entity which permits the destination entity's routing plan to be adequately administered, a) information is collected about all call attempts to particular, specified dialed numbers even before they are switch routed, including even calls terminated before a network control point (NCP) returns instructions as to where to route the call and, if applicable, after they are rerouted and b) the collected information is periodically delivering as it becomes available, for use by the destination entity, without requiring the calls being monitored to have been terminated. Thus, for example, information is collected about calls being held by the NCP in a queue even before the calls are NCP routed. The collected information also includes information for calls that were never routed, because they were terminated before routing, independent of whether they were placed in a queue. If applicable, additional information is collected about the rerouting of those calls that are rerouted. Additionally, information is collected concerning the performance of a network control point, including information on queue performance and routing location selection performance.

27 Claims, 15 Drawing Sheets

TELEPHONE CALL MONITORING METHOD AND APPARATUS

TECHNICAL FIELD

This invention to the monitoring of telephone calls and, more specifically, to the accumulating of information relating to telephone calls destined for a single entity.

BACKGROUND OF THE INVENTION

For the network of an interexchange carrier to complete a call placed to a telephone number that requires translation, such as 800- and 900-type telephone number, at least two steps are required. The first step is the making of a decision on how to route the call, i.e., determining an actual destination to which the call should be routed that is understandable by the switches making up the network. This step is typically performed by a network control point (NCP) which communicates with the switches of the network via a signaling network, and is therefore called "NCP routing". The second step is the actual following by a switch of the instructions supplied by NCP. This is called "switching routing".

One prior art telephone call monitoring system requires that a call attempt—which includes any complete attempt to place a call, i.e., all digits dialed, whether the call is successful or not—be switch routed before making available any information about a call. Also, such a system does not provide information for those calls that could not be completed to a first location of the entity to which the call was placed, the so-called "destination entity", and for which the telephone network automatically attempted to complete the call to one or more subsequent locations according to instructions previously specified by the destination entity. Another prior art telephone call monitoring system only monitors a sampling of call attempts and delivers the information it collects the next day or later.

From the information provided by such prior art systems, the destination entity could only develop an incomplete and/or untimely picture of the calling pattern for the calls placed to it. Unfortunately, such an incomplete and/or untimely picture is insufficient to permit the destination entity to adequately administer its routing plan, i.e., the instructions given to the telephone network specifying how to complete calls placed to the destination entity's telephone numbers. This is especially true because the rapid dissemination of news or advertising can cause radical changes in the calling pattern of a destination entity in a short amount of time.

SUMMARY OF THE INVENTION

We have realized that the prior art approach to the monitoring of telephone calls, in which calls are monitored only after they are switch routed and only for the first attempted location, or in which only a sample of the calls are monitored and the collected information delivered at a much later time, is unduly limiting and, in accordance with the principles of the invention, this limitation is overcome by a) collecting information about all call attempts to particular, specified dialed numbers even before they are switch routed, including even calls terminated before the NCP returns instructions as to where to route the call and, if applicable, after they are rerouted and b) periodically delivering the collected information as it becomes available, for use by the destination entity, without requiring the calls being monitored to have been terminated. Thus, for example, information is collected about calls being held by the NCP in a queue even before the calls are NCP routed. Additionally, information may be collected for particular call attempts concerning the reason such attempts were not NCP routed. Thus, a complete picture of the calling pattern of calls placed to the destination entity is timely made available and, advantageously, the routing plan can be adequately administered. The principles of the invention are embodied in a call data processor which collects the information about call attempts and delivers at least a portion of the collected information to each called destination entity independent of the call attempts for which the information is collected. By independent it is meant that there is no fixed timing relationship between the call attempts and the delivery of the collected information and that the collected information is delivered over a communication path different than the communication paths of the call attempts that are monitored. Furthermore, the call data processor may monitor multiple dialed numbers for each destination entity.

In one embodiment, each call arriving at a switch of an interexchange carrier (IXC) requests routing instructions from an NCP that is capable of supplying messages that indicate the underlying basis of its actions to the call data processor. If the NCP can route the call, it sends information about how it handled the call to the call data processor. If the NCP cannot return routing instructions to the switch, the NCP a) sends a message to the switch to terminate the call and b) sends at least one message to the call data processor, the message containing the internal parameters employed by the NCP in making its decision not to route the call, thereby indicating the reason for its decision. Routing instructions might not be returned for masons such as the caller abandons the call before the NCP can determine the instructions or it appears to the NCP that the selected location of the destination cannot complete the call.

Information for switch unrouted calls is 1) combined with information for switch routed calls, 2) separated by destination entity, 3) sorted and selected based on destination entity-specified parameters and 4) supplied to the destination entity in a predetermined format. In the event the IXC's switch attempts to route the call to more than a single location, because the call could not be completed to the originally or any subsequently selected locations, the NCP supplies to the call data processor, on an attempt-by-attempt basis, information concerning the disposition and nature of each attempt. Each attempt subsequent to the original is reported to the destination entity as a redirected attempt, which is distinguishable from an original attempt. Alternatively, the format may be that of a report which conveys in a single summary-type representation information about a plurality of call attempts.

DETAILED DESCRIPTION

Figure 1:
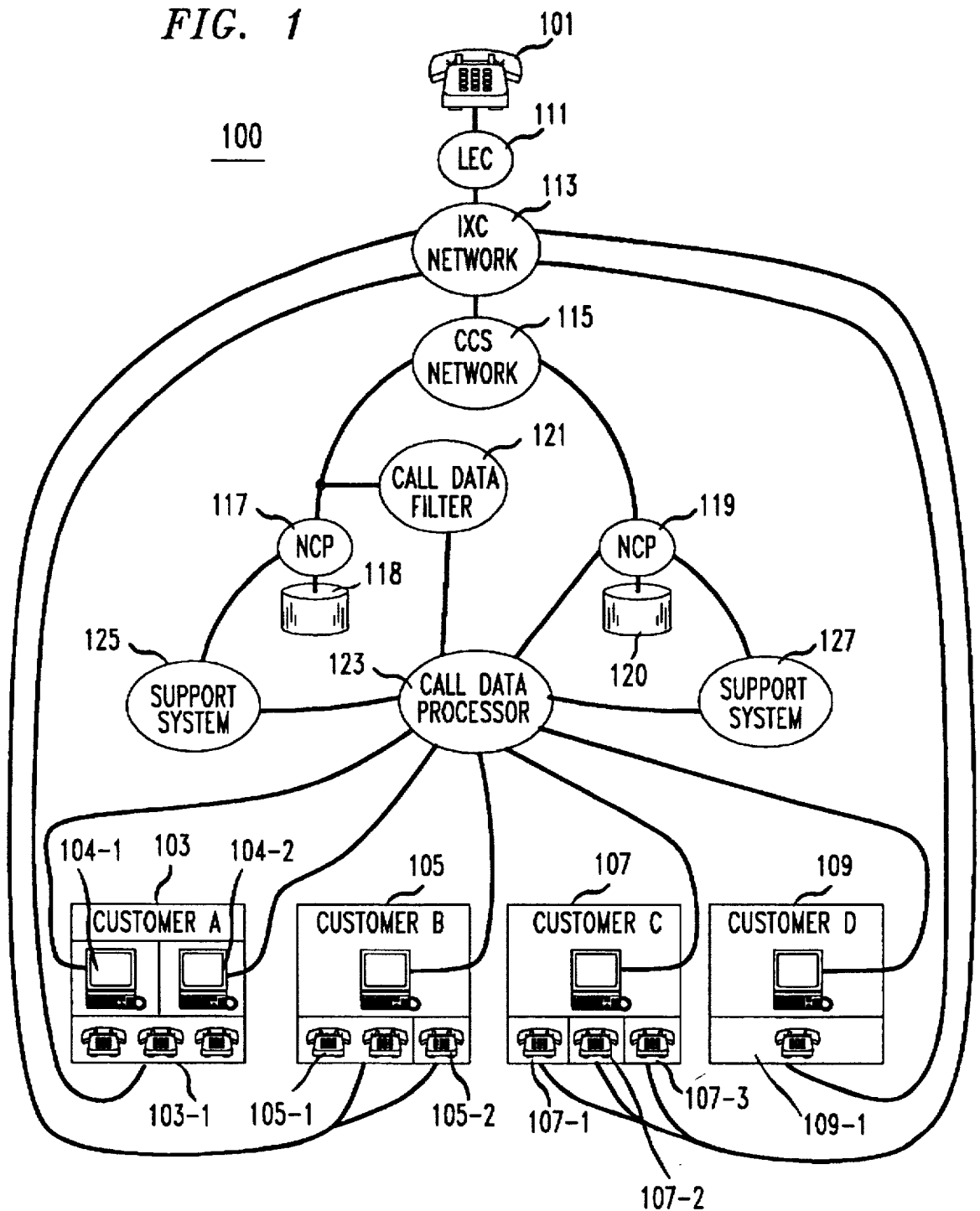
FIG. 1 shows an exemplary network for completing telephone calls and collecting information about calls, both those that could be routed and those that could not be routed, in accordance with the principles of the invention.

FIG. 1 shows exemplary network 100 for completing telephone calls and collecting information about calls, both those that could be routed and those that could not be routed, in accordance with the principles of the invention. A caller at telephone station 101 may seek to call any location of any destination entity in network 100. A destination entity is a telephone subscriber that can have one or more locations at which it can receive telephone calls and one or more locations at which it may receive information about the telephone calls that it receives. Each location typically corresponds to a regional office of the destination entity, the locations being geographically separated. Typical destination entities include large airlines, which take reservations at a variety of different locations, and the Internal Revenue Service (IRS), which provides tax processing and information at a variety of different locations. One or more telephone numbers, which are assigned to a destination entity, may be associated with each location of a destination entity that receives telephone calls. Furthermore, one or more locations of a destination entity may have the same telephone number, at the option of the destination entity. The destination entity may also assign each location a mnemonic name.

Destination entities shown in network 100 include customer A 103, customer B 105, customer C 107, and customer D 109. Customers A and B each have only a single location at which they receive all calls placed to them, locations 103-1 and location 109-1, respectively. Customers B and C have more than one location at which they receive calls, namely, locations 105-1 and 105-2 for customer B and locations 107-1, 107-2 and 107-3 for customer C. Each destination entity telephone depicted represents a group of agents, e.g., 50 agents per group, each agent having his own incoming telephone line at which calls are completed. Furthermore, customer A 103 receives information about its calls at two different terminals, terminals 104-1 and 104-2. Terminals 104-1 and 104-2 may be geographically separated. It is noted that the terminals of the destination entities are shown as being directly connected to call data processor 123. Such connections are typically implemented as packet data connections, such as X.25, over a packet data network (not shown). Alternatively, such connections may be asynchronous connections routed, in whole or in part, through IXC network 113 over different communication paths than those used for the can attempts.

The caller at telephone station 101 may, for example, wish to buy airline tickets at half price. Assume that customer A 103, customer B 105, customer C 107, and customer D 109, are each, for example, major airlines offering half price tickets during an airline industry fare war. The caller selects a customer to call and dials a digit string, including a predetermined number, such as an 800-type number, that has been established by the selected customer.

Local exchange carrier (LEC) 111 receives the call, in accordance with typical telephone call processing procedures in the United States, and recognizes, from the dialed digit string, that the caller's call is to be completed by an interexchange carrier. Accordingly, LEC 111 forwards the call to an originating switch in interexchange carrier (IXC) network 113 of the interexchange carrier specified by the customer being called. LEC 111 also determines the appropriate interexchange carrier from the dialed digit string.

In order to route the call, IXC network 113 transmits a query requesting routing instructions for the call to common channel signaling (CCS) network 115. CCS network 115 routes the query to either network control point (NCP) 117 or network control point (NCP) 119, whichever is appropriate based on the telephone number of the customer that was dialed at telephone station 101. Network control points, which are well known in the art, maintain and update data bases, e.g., databases 118 and 120, with which they are associated. They also process queries for information from their associated data bases.

NCP 117 is a currently deployed NCP for which the only type of information that can be gathered concerning its operation is the information that can be gathered by monitoring the signaling messages supplied to and from NCP 117. This is because NCP 117 lacks the capability needed to directly provide information concerning the analysis it performed to determine the treatment of each call. Call data filter 121 monitors and selects the signaling messages communicated to or from NCP 117 that are of interest to customers 103, 105, 107, or 109. In contrast, NCP 119 is a new type of NCP that can perform all the functions of NCP 117 and, in addition, it has the ability to directly provide its call treatment analysis information over an additional communications path directly to call data processor 123. Such call treatment analysis information includes a) information about the states of queues maintained in NCP 119, b) the predictions NCP 119 makes concerning the availability of lines at a particular location of a destination entity to which a call may be routed successfully and c) the specific sequence of alternate locations that were evaluated as potential locations for completing the call.

In accordance with the principles of the invention, information about calls and call attempts is collected and stored by call data processor 123. The information collected about each call is grouped into one or more records, which are structured as tables. Such tables are shown and defined below. By way of introduction, Table 1 shows a basic call record, which is used for calls the nature of which can be determined solely from the signaling messages communicated to and from an NCP. Table 2 shows an extended call record, which is a shorthand notation for the fields of a basic call record (Table 1) and an additional field. The extended call record is a component of the alternate location call record, shown in Table 3. An alternate location call record is generated when NCP 119 tries to complete a call to the first location it predicts is available from a predetermined sequence of alternate locations, the sequence having been previously defined by the destination entity. Tables 4 and 5 show queued and dequeued call records, respectively. These records are used to monitor the performance of queues inside NCP 119. A use of queues for the completion of calls to destination entities having multiple locations is described in U.S. Pat. No. 4,953,204 entitled Multilocation Queuing for Telephone Calls issued on Aug. 28, 1990 to Robert F. Cusehleg. Jr. et at., which is incorporated herein by reference. Table 6 shows a failed call record, which is generated when NCP 119 predicts a call can be completed to a particular location but, ultimately, the call can not be completed as predicted.

If a query requesting call routing is forwarded to NCP 117, the signaling messages between CCS network 115 and NCP 117 are copied by call data filter 121. Call data filter 121 discards messages which are not of interest to any of customers 103, 105, 107, or 109. Call data filter 121 collects all messages concerning the call until NCP 117 either returns routing instructions for the call or the call is terminated without routing instructions. The call may be terminated by either IXC network 113 or by NCP 117 without routing instructions ever having been received by IXC network 113.

If routing instructions are not returned for the call, then call data filter 121 supplies to call data processor 123 a basic call record for the call. A limited functionality, prior art call data processor is shown and described in U.S. Pat. No. 4,788,718 entitled Call Data Collection and Modification of Received Call Distribution issued on Nov. 29, 1988 to Sandra D. McNabb and Richard S. Yien, which is incorporated herein by reference. Table 1 shows the fields that make up a basic call record and an explanation of the types of values that can be stored in those fields. Exemplary information included in the basic call record for a call for which routing instructions are not returned includes 1) the caller dialed number in the DIAL_ID field, 2) the automatic number identification (ANI), i.e., the telephone number of the calling station (or the carrier or country if the call originated outside of the North American numbering plan), in the CALL_ORIG field and 3) a predetermined code indicating the reason for not routing the call in the TREAT_ID field.

TABLE 1

Basic Call Record (BASIC_CR)

| | |
|---|---|
| DIAL_ID | Dialed Number Identifier - Indicator of caller-dialed digits. |

TABLE 1-continued

Basic Call Record (BASIC_CR)

| | |
|---|---|
| CALL_ORIG | Call Origin - Redirection indicator or caller's ANI. |
| TREAT_ID | Treatment Identifier - Routing telephone number, code for unrouted disposition, or announcement number. |

If routing instructions are returned for the call, call data filter 121 supplies to call data processor 123 a basic call record in which the values of the fields are the same as for the unrouted call except that the routing telephone number (RTN), i.e., the number of the telephone station to which NCP 117 will attempt to route the call, is supplied as the value of TREAT_ID in place of the code indicating the reason for not routing the call.

If the call was routed, it is possible that NCP 117 supplied to IXC network 113 more than one potential location of the destination entity to which the call could be routed. If the call could not be routed to the first supplied (original) location, then IXC network 113 attempts to route the call to one of the other (subsequent) locations. Each time a subsequent location is attempted a message so indicating is transmitted from IXC network 113 to NCP 117. For each such received message, call data filter 121 builds an additional basic call record. Each additional basic call record for a call has the same values for its fields as the basic call record built when the call was originally routed, except that in place of the ANI a code indicating redirection is supplied as the value of the CALL_ORIG field.

If a query requesting call routing for a call is forwarded to NCP 119, rather than to NCP 117, NCP 119 sends directly to call data processor 123 at least one call record for the call if it is of interest to any of customers 103, 105, 107, or 109. The type of call record sent and the information contained therein depends on the nature of the call and the current call status at the time the call record is sent. However, the set of one or more such call records for an individual call always includes at least the same fields and information as in a basic call record.

TABLE 2

Extended Call Record (EXT_CR)

| | |
|---|---|
| BASIC_CR | Basic Call Record - As defined previously in Table 1. |
| Q_ID | Queue Identifier - Identity of a full queue, if any, on which the call was barred from being placed. |

TABLE 3

Alternate Location Call Record (ALOC_CR)

| | |
|---|---|
| EXT_CR | Extended Call Record - As defined previously in Table 2. |
| SEQ_ID | Sequence Identifier - Identity of the particular sequence of alternatives used to route the call (i.e., the last in a series of possible sequences). |
| LOC_CNT | Location Count - Total number of alternative locations attempted, of which at most one was predicted to be available. |
| SEQ_CNT | Sequence Count - Total number of sequences attempted, in the series of possible sequences. |

If a call was unrouted, an extended call record is sent including a code indicating a reason for not routing the call in the TREAT_ID field, in accordance with the principles of the invention. If a call was routed, an extended call record is sent including the routing telephone number in the TREAT_ID field. If NCP 119 evaluated a sequence of locations of a destination entity in determining to which location to complete the call, then the type of record sent by NCP 119 is called an alternate location call record, in accordance with an aspect of the invention. Table 3 shows the fields that make up an alternate location call record and an explanation of the types of values that can be stored in those fields. The EXT_CR designation is a shorthand for the fields shown and defined in the extended call record shown and defined in Table 2. The purpose of these fields is to report, in accordance with an aspect of the invention, information about steps taken by NCP 119 in selecting one among several possible locations to which the call can be completed.

If NCP 119 places the call in a queue until it predicts that the call can be completed to a location of the destination entity, a queued call record is supplied for the call when it is initially placed in the queue and a dequeued call record is supplied for the call when the call is dequeued, i.e., when it exits the queue, in accordance with an aspect of the invention. Table 4 shows the fields that make up a queued call record and an explanation of the types of values that can be stored in those fields. Table 5 shows the fields that make up a dequeued call record and an explanation of the types of values that can be stored in those fields. The purpose of these records is to report information about queue performance, in accordance with the principles of the invention.

The queued call record that is sent when a call enters a queue includes the number of calls currently in that queue. If multiple queues are maintained for a destination entity, e.g., one queue for each location of the destination entity, the queued call record identifies the particular queue into which the call has been placed by the value stored in the Q_ID field. If a queue for a destination entity having more than one queue overflows, NCP 119 may provide alternate handling of the call, such as terminating it to a curtesy announcement rather than to an actual intended destination entity. Another type of such alternate handling is to place the call in another one of the queues for that destination entity. For an alternately handled call, NCP 119 sends to call data processor 123 an extended call record (Table 2) that contains an indication of the queue-overflow, in accordance with an aspect of the invention. The basic call record (Table 1) which is included as part of such an extended call record, contains in its TREAT_ID field a value indicating the alternate handling that is provided for that same call.

TABLE 4

| Queued Call Record (Q_CR) | |
|---|---|
| DIAL_ID | Dialed Number Identifier - Indicator of caller-dialed digits. |
| CALL_ORIG | Call Origin - Redirection indicator or caller's ANI. |
| Q_ID | Queue Identifier - Identity of the queue on which the call has been placed. |
| NUM_INQ | Number of Calls in Queue - Number of calls currently waiting in this queue. |
| CALL_ID | Call Identifier - Transaction number of this call. |

TABLE 5

| Dequeued Call Record (DQ_CR) | |
|---|---|
| TREAT_ID | Treatment Identifier - Routing telephone number, code for unrouted disposition (including caller-abandon or time-out), or announcement number. |

TABLE 5-continued

| Dequeued Call Record (DQ_CR) | |
|---|---|
| CALL_ID | Call Identifier - Transaction number of this call. |
| Q_ID | Queue Identifier - Identity of the queue from which the call has been removed. |

If NCP 119 predicts that the call can be completed to a location of the destination entity, but the IXC network 113 is unable to complete the call to that location, the IXC network sends a message so indicating back to NCP 119. In response to the message from IXC network 113, NCP 119 sends a failed call record directly to call data processor 123, in accordance with an aspect of the invention. Table 6 shows the fields that make up a failed call record and an explanation of the types of values that can be stored in those fields. The purpose of the failed call record is to report information about the accuracy of the predictions made by NCP 119, in accordance with an aspect of the invention.

It is possible that NCP 119 supplies to IXC network 113 more than one potential location for any particular destination entity to which the call might be completed. If IXC network 113 could not route the call to the first supplied (original) location, it attempts to route the call to one of the other supplied (subsequent) locations. Each time a subsequent location is attempted, IXC network 113 transmits a message so indicating to NCP 119. In response to each such message, NCP 119 fills a basic call record indicating redirection in the CALL_ORIG field and supplies the record directly to call data processor 123, in accordance with an aspect of the invention. The purpose of having multiple records is to report information about all the attempts by IXC network 113 to complete the call, in accordance with the principles of the invention.

TABLE 6

| Failed Call Record (FAIL_CR) | |
|---|---|
| BASIC_CR | Basic Call Record - As defined previously in Table 1. |
| FAIL_ID | Failure Identifier - An indicator of the cause or type of failure. |
| Q_ID | Queue Identifier - Identity of the queue, if any, that the call left when routed. |
| SEQ_ID | Sequence Identifier - Identity of the particular sequence of alternatives, if any, that was used to route the call (i.e., the last in a series of possible sequences). |

The foregoing illustrates how call data processor 123 receives information about individual telephone calls. Call data processor 123 does not, however, transmit the information to the destination entities exactly as received. Rather, in accordance with an aspect of the invention, call data processor 123 performs additional functions of translating, filtering and formatting the information. The purpose of translating is to ensure that individual elements of information, as transmitted, are intelligible to the destination entity. For example, IXC network 113 may employ an internal or proprietary scheme for representing dialed telephone numbers or routing telephone numbers. If such numbers appear in the received call records, then call data processor 123 must translate them into external or nonproprietary numbers that the destination entities will recognize. The purpose of filtering is to select information that the individual destination entities have requested to be transmitted, and to discard any received information not so requested. An example is that a destination entity might have specified, as an option, that it wishes to have transmitted information about failed or redirected calls, but not about other calls. The purpose of formatting is to present the transmitted information in a desired arrangement.

It is noted that the transmitting of the information is "independent" of the call attempts for which the information is collected. By "independent" it is meant that there is no fixed timing relationship between the call attempts and the transmission of the collected information and that the collected information is delivered over a communication path different from the communication paths of the call attempts for which information is received.

Tables 1, 2, 3, 4, 5 and 6 and the foregoing description illustrate the information that call data processor 123 receives about individual telephone calls. Tables 7, 8, 9, 10, supra, are exemplary outputs developed by call data processor 123. Described hereinbelow are the processes by which call data processor 123 develops the outputs that it transmits to destination entities 103, 105, 107 and 109. It is noted that a) the necessary translations are performed predominantly by processes shown in FIGS. 3, 5, 7, 9, 9A, 10, 11, 11A and 12, b) the necessary filtering is performed predominantly by processes shown in FIGS. 2, 4, 6, 8 and 13, and c) the necessary formatting is performed predominantly by the process shown in FIG. 8.

Information necessary for the translation function is provided to call data processor 123 by support system 125, associated with NCP 117, and support system 127, associated with NCP 119. Each support system serves as a gateway to its respective NCP. An adjunct processing system, such as call data processor 123, that wishes to send data to an NCP, should do so via a support system. Such a requirement is desirable to protect the NCPs in a network from overloads or intrusions that might interfere with their processing of telephone calls.

Figure 2:
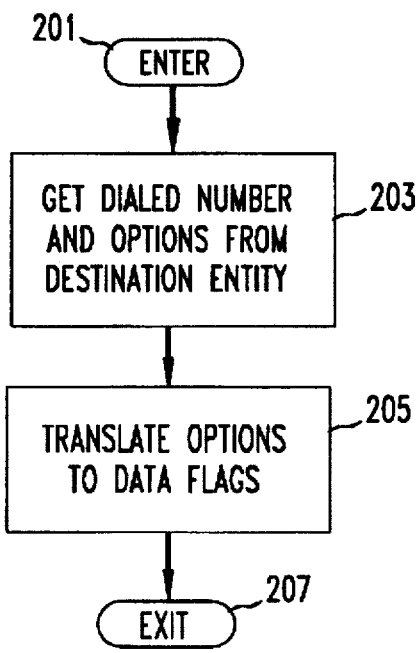
FIG. 2 shows a flow chart of an exemplary process by which the call data processor shown in FIG. 1 receives instructions from a destination entity as to how it should present call information to that destination entity.

FIG. 2 shows a flow chart of an exemplary process by which call data processor 123 receives instructions, i.e., the options desired, from a destination entity as to how it should present call information to that destination entity. Call data processor 123 and the destination entities communicate by exchanging messages in a predefined format. Development and use of a message format is well known in the art. The process is entered in step 201, when one of the destination entities undertakes to specify the format in which it should receive call information.

In step 203, call data processor 123 receives from the destination entity at least one of the telephone numbers that a caller must dial in order to reach that destination entity. It also receives a specification of the options that the destination entity wishes to employ for reporting information concerning calls placed to each such received telephone number. The options indicate which records call data processor 123 should present and how to format those records that are presented. Call data processor 123 can identify each destination entity by the point at which the destination entity accesses call data processor 123. Therefore, each destination entity can be limited to modifying the options for only those dialed numbers which are assigned to it. In step 205, call data processor 123 translates the options received from each destination entity into data flags suitable for support systems 125 (FIG. 1) and 127 as well as for call data filter 121. Thereafter, the process is exited via step 207.

Figure 3:
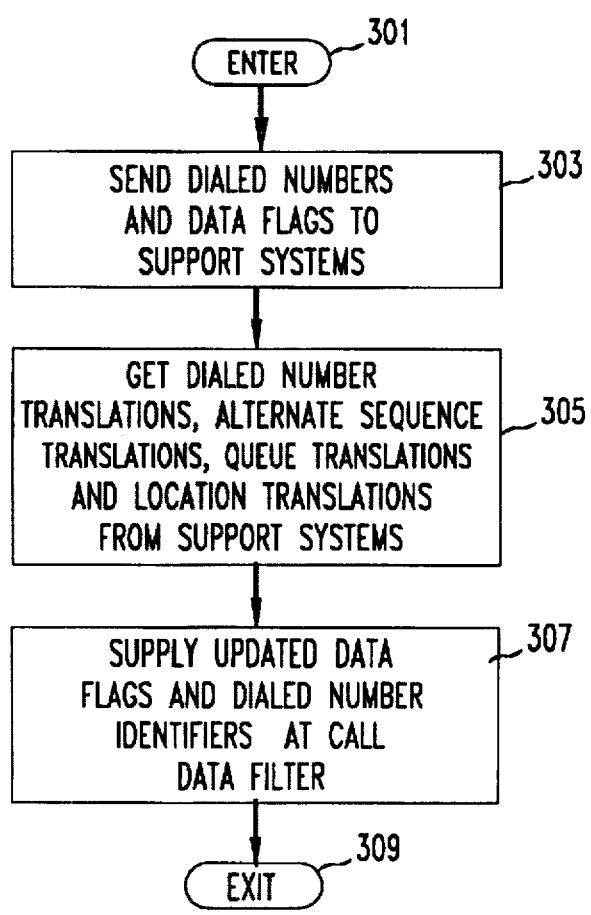
FIG. 3 shows a flow chart of an exemplary process performed by the call data processor of FIG. 1 to obtain particular information if requires from the support systems shown in FIG. 1.

FIG. 3 shows a flow chart of an exemplary process performed by call data processor 123 to obtain particular information it requires from support systems 125 and 127. Support systems 125 and 127 keep timely the information that they make available to call data processor 123. The process is entered, via step 301, at a scheduled time, e.g., 8:00 p.m. each evening. Such entry may be triggered by call data processor 123 receiving an internal timing interrupt.

In step 303, call data processor 123 sends to support systems 125 and 127 both a) the dialed numbers and b) their associated data flags. The data flags were developed, from the destination entity supplied options, by the process shown in FIG. 2. In step 305, call data processor 123 gets from support systems 125 and 127 1) dialed number translations, 2) alternate sequence translations, 3) queue translations, and 4) location translations.

Translations are mappings from the internal representation used by an NCP into a representation understandable by the destination entities. Dialed number translations are a mapping from a dialed number identifier into the corresponding number dialed by the caller, which is comprehensible by the destination entity. A dialed number identifier maybe either the same number as the number dialed by the caller at telephone station 101 or a translated number that is specifically created for use in the CCS network 115. Such a translated number might be specifically created where, for example, the caller at telephone station 101 is located in a foreign country that does not employ the North American Numbering Plan (NANP) for telephone line numbering. An alternate sequence translation is a mapping from a number that identifies a particular subroutine in the NCP 119 that specifies how NCP 119 should implement a particular alternate sequence to a label corresponding to the same information that is comprehensible by the destination entity. A queue translation is a mapping from a number that identifies a particular queue in the NCP 119 to a label for the queue that is comprehensible by the destination entity. A location translation is a mapping from a routing telephone number to a label for the number that is comprehensible by the destination entity. Some or all of the translated information that is comprehensible by the destination entity may be in the form of mnemonics.

A support system is loaded with the translation information by personnel of either the destination entities or the IXC. The support systems, in turn, make the information available to the NCPs and, in step 305, to call data processor 123. Next, in step 307, call data processor 123 supplies the data flags and the just obtained dialed number identifiers to call data filter 121. Thereafter, the process exits via step 309.

Figure 4:
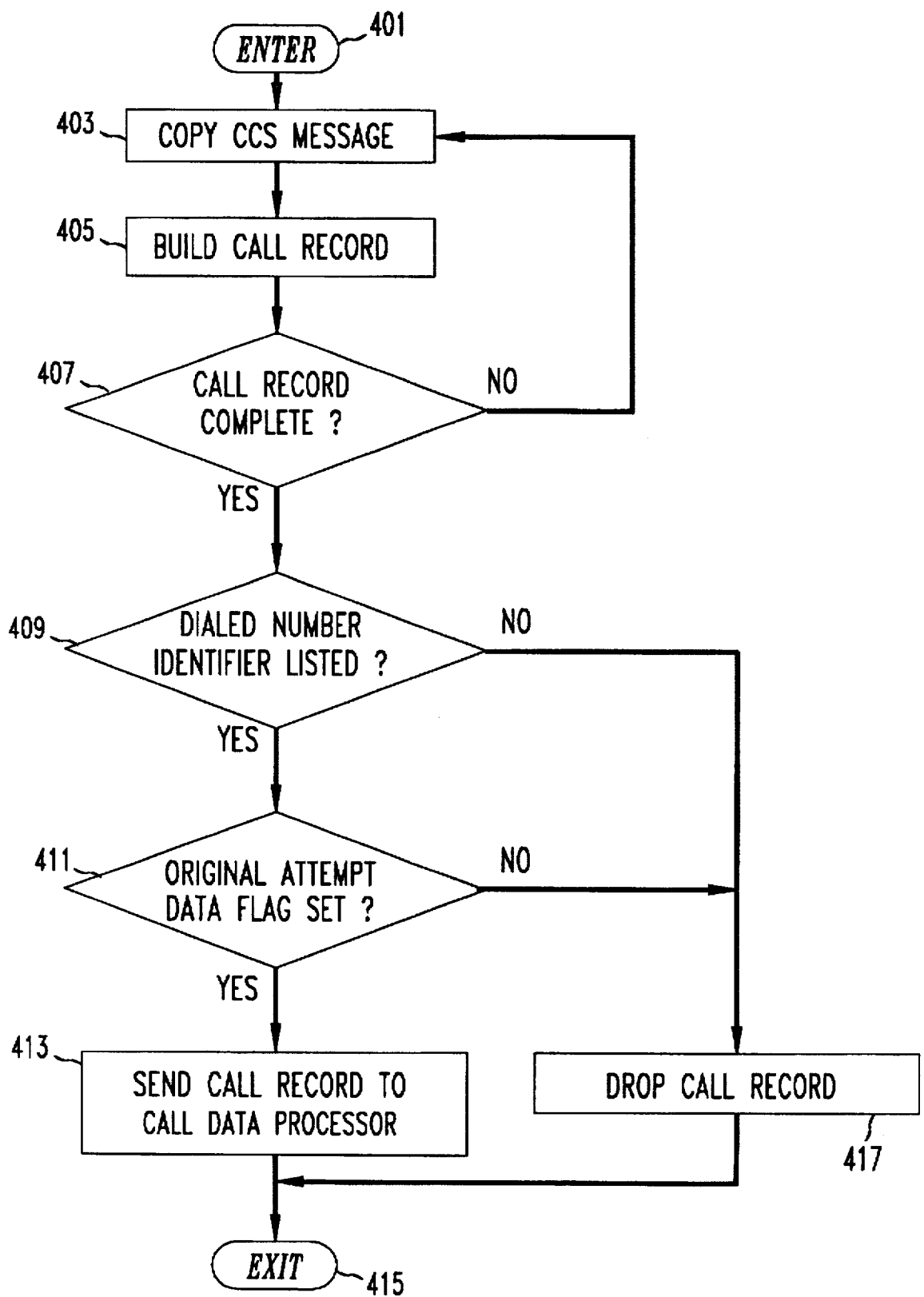
FIG. 4 shows a flow chart of an exemplary process by which the call data filter shown in FIG. 1 collects information from the CCS network shown in FIG. 1 to send to the call-data processor of FIG. 1.

FIG. 4 shows a flow chart of an exemplary process by which a call data filter, such as call data filter 121, collects information from CCS network 115 and builds basic call records (Table 1) to send to call data processor 123. The process is entered, in step 401, when a call data filter detects a CCS message bound for its associated NCP. Thereafter, in step 403, the detected message is copied into call data filter 121, and in step 405 call data filter 121 builds a call record by transferring information from the message into corresponding fields of the call record.

Next, conditional branch point 407 tests to determine if the call record is complete, i.e., has the call data filter received the final CCS message for the call. If the test result in step 407 is NO, additional information is required to complete the call record. The additional information is available, if no errors occur, from subsequent CCS messages. Therefore, control returns to step 403. If, however, the result in step 407 is YES, control passes to step 409.

Conditional branch point 409 tests to determine if the dialed number identifier, DIAL_ID, of the CCS message is listed in call data filter 121. As noted, dialed number identifiers were previously supplied to call data filter 121 by call data processor 123 in step 307 of the process shown in FIG. 3. If listed, they indicate that the dialed telephone number corresponding to the dialed number identifier may be one about which one or more destination entities wants to receive information, as determined in step 203 of the process shown in FIG. 2. If the test result in step 409 is YES, control passes to conditional branch point 411, which tests to determine if the original attempt data flag corresponding to the dialed number identifier of the CCS message is set. The settings of the data flags represent the options selected by the destination entity as to the types of information it wishes to receive about its calls. For example, a setting of a particular one of the data flags may mean that the destination entity wishes to receive information only for redirected calls, not for original call attempts. The data flag is set or cleared in the most recent iteration for the current DIAL_ID of step 307 of the process shown in FIG. 3. If the test result in step 411 is YES, control passes to step 413, in which the completed call record is sent to call data processor 123. The process is then exited via step 415. If the test result in step 409 is NO, or the test result in step 411 is NO, control passes to step 417, in which call data filter 121 drops the call record. The process then exits in step 413.

Figure 5:
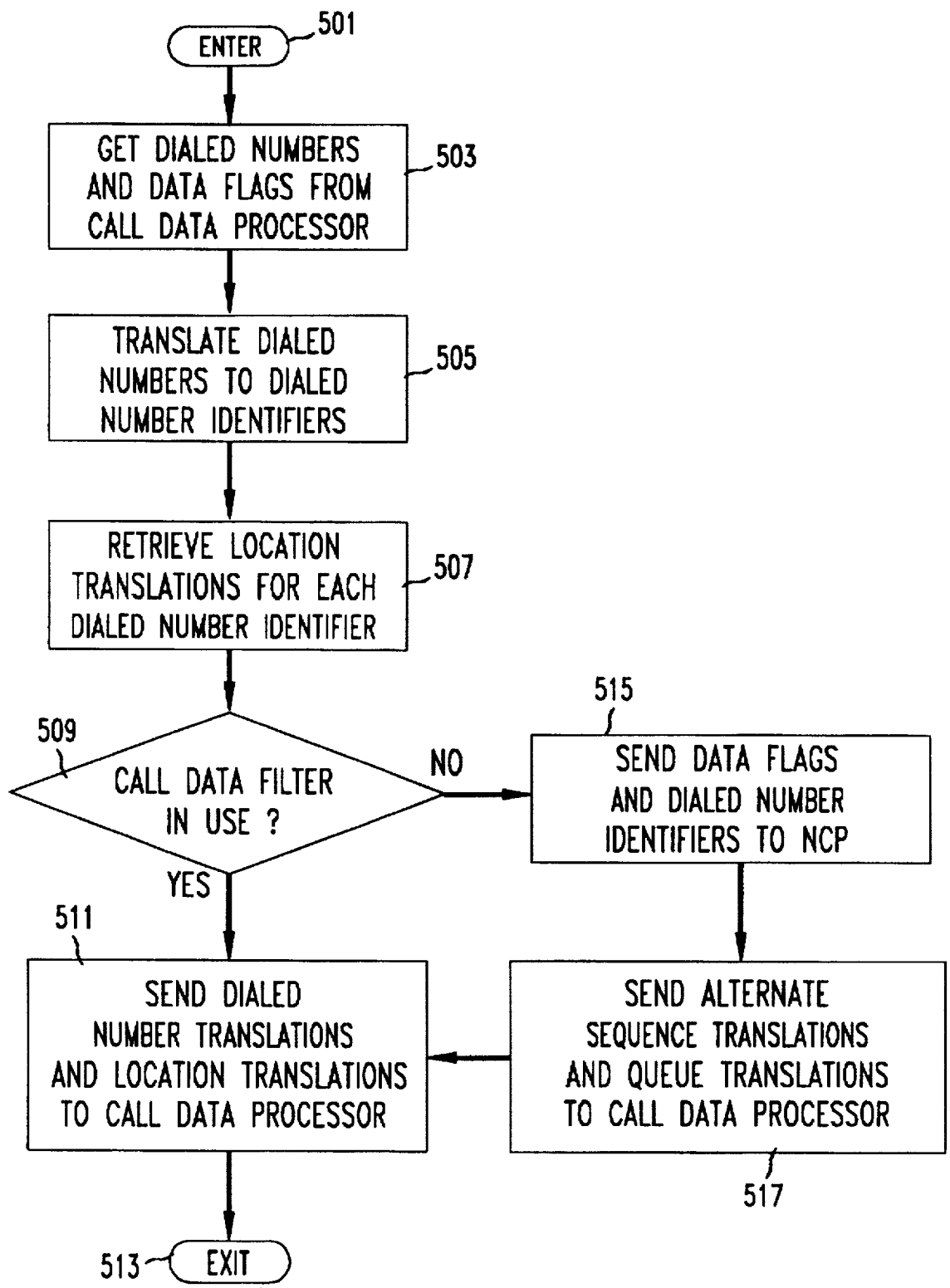
FIG. 5 shows a flow chart of an exemplary process performed independently by each of the support systems shown in FIG. 1.

FIG. 5 shows a flow chart of an exemplary process performed independently by each of support systems 125 and 127. The processes shown is performed, essentially, between the operations shown in steps 303 and 305 of the process shown in FIG. 3. When either support system 125 or 127 receives dialed numbers and data flags from call data processor 123, the support system so receiving enters the process in step 501.

In step 503, the support system receives a batch of dialed numbers and their associated data flags from call data processor 123. In step 505, the support system translates the dialed numbers into dialed number identifiers, DIAL_ID. Again, a dialed number and its corresponding dialed number identifier constitute a dialed number translation. As noted above, the dialed number is the number actually dialed by the customer at telephone station 101 and the dialed number identifier is either the same number as the dialed number or it is a translated number that is created for use in the CCS network 115. In step 507, the support system retrieves the routing telephone numbers which NCPs 117 or 119 may use when routing calls for the corresponding dialed number identifiers and which may appear in the TREAT_ID field of a call record (Tables 1 and 5). The support system also retrieves a label value for each telephone call, which is stored in the TREAT_LABL field, for each routing telephone number. The label and corresponding routing telephone number together make up a location translation.

Next, conditional branch point 509 tests to determine if a call data filter is being used for this dialed number identifier. If the test result in step 509 is YES, control passes to step 511. In step 511, the support systems sends the determined destination entity location translations, as well as their corresponding dialed number translations, back to call data processor 123. Thereafter, the process exits via step 513.

If the test result in step 509 is NO, i.e., a call data filter is not in use, control passes to step 515, in which the support system sends dialed number identifiers and their corresponding data flags to NCP 119. Next, in step 517, the support system sends alternate sequence identifiers and labels, as well as queue identifiers and labels, to call data processor 123. Control is then transferred to step 511, and the process continues as described above.

Figure 6:
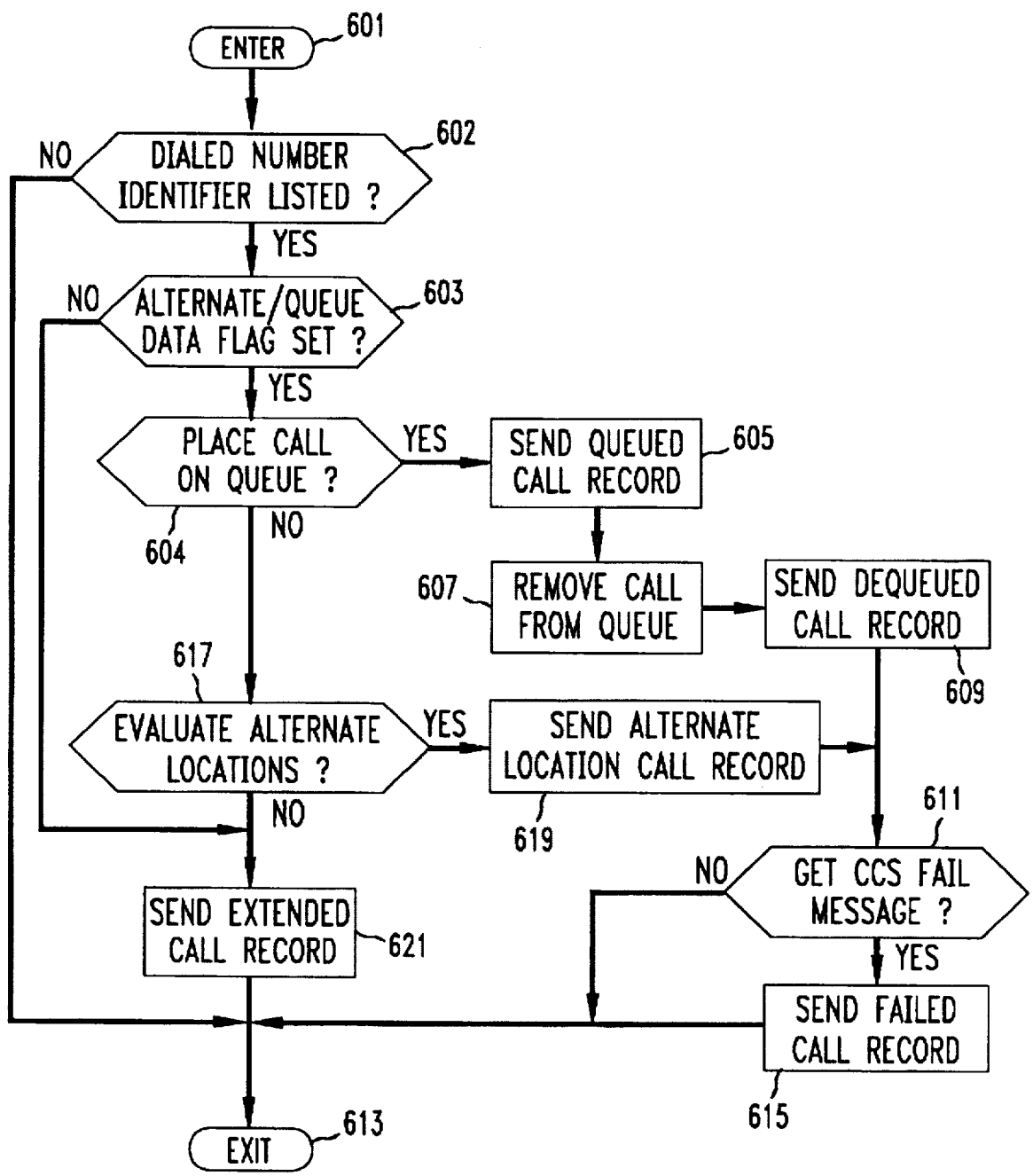
FIG. 6 shows a flow chart of an exemplary process by which one of the NCPs shown in FIG. 1 collects information from the CCS network of FIG. 1 and builds call data records to send to the call data processor of FIG. 1.

FIG. 6 shows a flow chart of an exemplary process by which an NCP, such as NCP 119, collects information from CCS network 115 and builds call data records to send to call data processor 123. The process is entered, in step 601 when NCP 119 receives a message from CCS network 115 to begin processing a new call.

Conditional branch point 602 tests to determine if the dialed number identifier, DIAL_ID, of the call being processed is listed in NCP 119. As noted, dialed number identifiers were previously supplied to NCP 119 by support system 127. If the test result in step 602 is NO, control passes to step 613, via which the process is exited. If the test result in step 602 is YES, control passes to conditional branch point 603, which tests to determine if the alternate/queue data flag corresponding to the dialed number identifier of the call being processed is set. The setting of the flag indicates whether a destination entity requested that information be transmitted to it about queued calls and calls for which NCP 119 evaluates a sequence of alternate locations for completing the call. The flag is set in the most recent iteration of step 515 of the process shown in FIG. 5. If the test result in step 603 is NO, control passes to step 621, in which NCP 119 builds and sends an extended call record for the call to call data processor 123. The process then exits via step 613.

If the test result in step 603 is YES, control passes to conditional branch point 604, which tests to determine if, as a result of the routing plan stored for the destination entity for which the call is bound, NCP 119 should place the call in a queue. If the test result in step 604 is YES, control passes to step 605, in which a queued call record is sent to call data processor 123. Next, in step 607, in response to a stimulus such as a) a time limit expires, b) the NCP predicts that a location is now available to which it can complete the call, or c) the caller at telephone station 101 hangs up, thereby abandoning the call, the call is removed from the queue. In step 609, NCP 119 sends a dequeued call record, corresponding to the queued call record, to call data processor 123.

Conditional branch point 611 then tests to determine if a FAIL message is received from IXC network 113 within a predetermined period of time. A FAIL message would be returned by IXC network 113 if it is unable to complete the dequeued call. If the test result in step 611 is NO, i.e. the call was successfully completed, the process is exited via step 613. If the test result in step 611 is YES, control passes to step 615, in which NCP 119 supplies a failed call record to call data processor 123. The process is then exited via step 613.

If the test result in step 604 is NO, i.e., the call may not be queued, conditional branch point 617 tests to determine if there exists more than one possible location to which the call may be completed. To do so, NCP 119 evaluates the possible locations to determine if any are available to route the call to. If the test result in step 617 is YES, control passes to step 619, in which NCP 119 sends an alternate location call record to call data processor 123. Next, control passes to conditional branch point 611 and the process proceeds as described above. If the test result in step 617 is NO, i.e., there was only a single location to which the call could have been completed, control passes to step 621, in which NCP 119 sends an extended call record for the call to call data processor 123. The process then exits via step 613.

Figure 13:
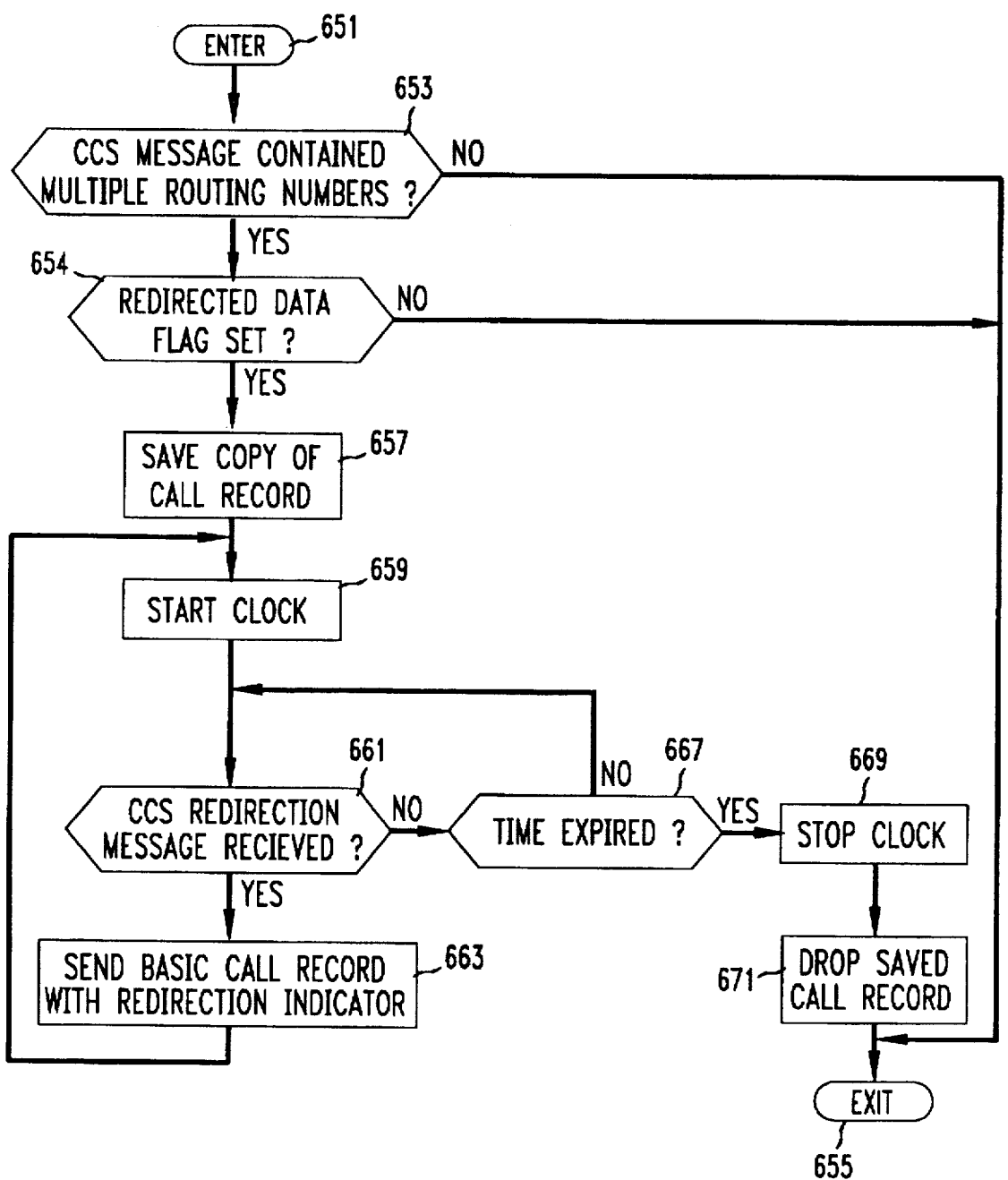
FIG. 13 shows a flow chart of an exemplary process by which either the call data filter or one of the NCPs of FIG. 1 generate call records for calls in which the NCP processing the call supplies to the IXC network shown in FIG. 1 a list of multiple, alternate, routing numbers to which the IXC network should attempt to complete the call.

FIG. 13 shows a flow chart of an exemplary process by which either call data filter 121 or NCP 119 generates call records for calls in which the NCP processing the call supplies to IXC network 113 a list of multiple, alternate, routing numbers to which IXC network 113 should attempt to complete the call. IXC network 113 attempts to complete the call to the routing numbers supplied in the order in which they are listed. Call data filter 121 enters the process in step 651 after it sends a call record to call data processor 123 in step 413 of the process shown in FIG. 4. Similarly, NCP 119 enters the process in step 651 after it sends a call record to call data filter 123 in step 609 or 621 of the process shown in FIG. 6.

Conditional branch point 653 tests to determine if the CCS routing message associated with the call record just sent contained multiple routing numbers. If the test result in step 653 is NO, i.e., only a single routing number was supplied, the process exits via step 655. If the test result in step 653 is YES, control passes to conditional branch point 654, which tests to determine if the data flag for redirected calls corresponding to the dialed number identifier of the CCS message is set. The settings of the data flags represent the options selected by the destination entity as to the types of information it wishes to receive about its calls. For example, the setting of the data flag for redirected calls for a destination entity may mean that the destination entity wishes to receive information for redirected calls. The data flag is set or cleared in the most recent iteration for the current DIAL_ID of step 307 of the process shown in FIG. 3. If the test result in step 654 is NO, the process exits via step 655. If the test result in step 654 is YES, a copy of the call record is saved in step 657. Next, in step 659, a clock is set to the maximum amount of time that the call record will be saved. Such a maximum amount of time is typically one minute. The clock is started to count down the time set. Control then passes to step 661.

Conditional branch point 661 tests to determine if a CCS redirection message is received from IXC network 113. Reception of a redirection message indicates that IXC network 113 could not complete the call to the routing number to which it just attempted to complete the call and that, therefore, it is attempting to complete the call to the next routing number, if any, on the list. If the test result in step 661 is YES, control passes to step 663, in which a basic call record having a redirection indicator stored in its CALL_ORIG field. Control then passes back to step 559.

If the test result in step 661 is NO, control passes to conditional branch point 667, which tests to determine if the time on the clock has expired. If the test result in step 667 is NO, control passes back to step 661. If the test result in step 667 is YES, control passes to step 669, in which the clock is stopped. Control then passes to step 671, and the saved call record is dropped. Thereafter, the process exits via step 655.

The processes shown, in flow chart form, in FIGS. 7, 9, 10, 11 and 12 all run continuously, independently and simultaneously in call data processor 123 (FIG. 1). Whenever a call record is received at call data processor 123, each of the shown processes become active to process the received call record.

Figure 7:
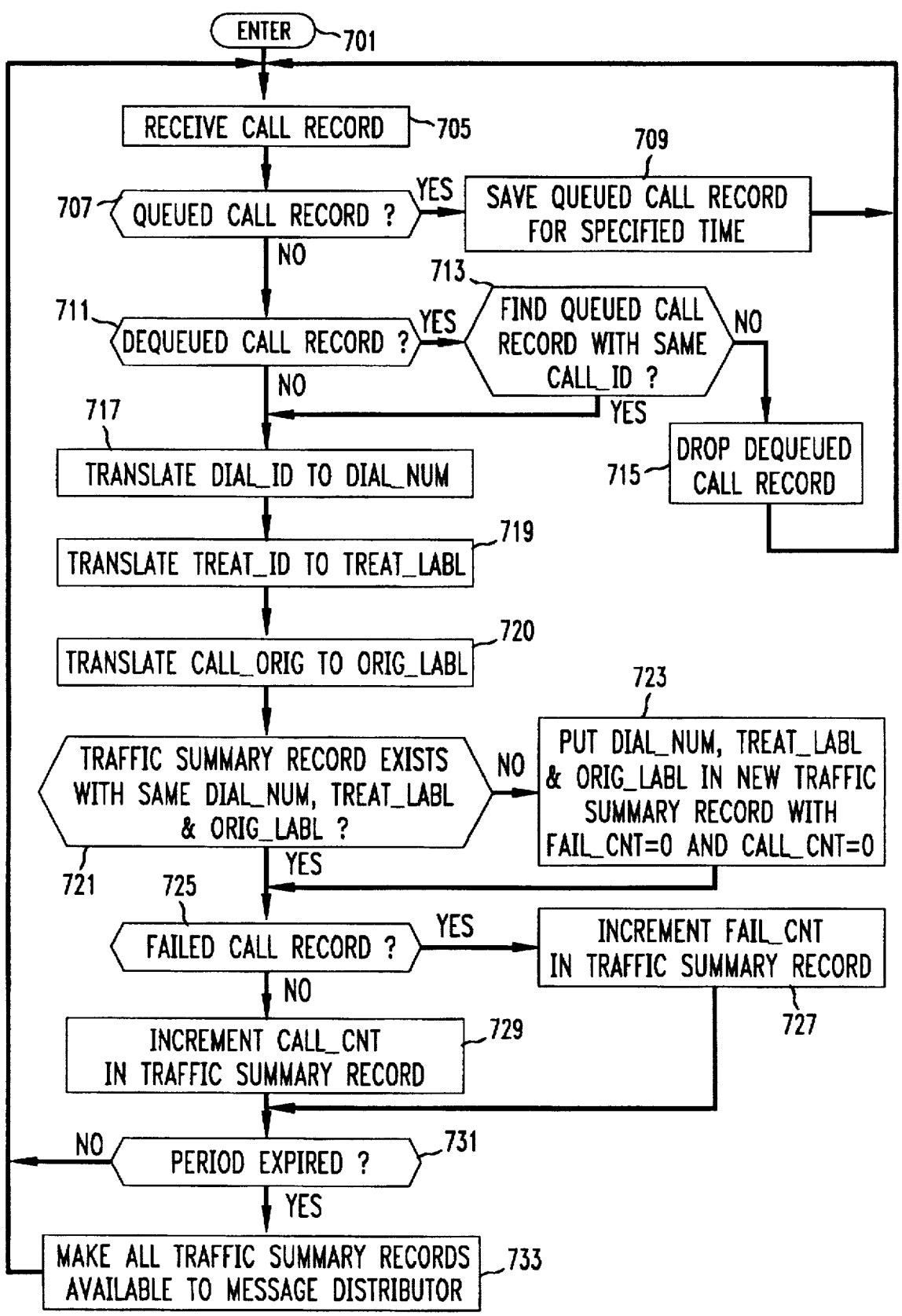
FIG. 7 shows a flow chart of an exemplary process, performed by the call data processor of FIG. 1, for constructing traffic summary records.

FIG. 7 shows a flow chart of an exemplary process, continually performed by call data processor 123, for constructing traffic summary records. Table 7 shows the fields that make up a traffic summary record and the types of values that can be stored in those fields. Accordingly, the process is entered in step 701 (FIG. 7) when call data processor 123 is started. The process shown restarts periodically. A typical period length is three minutes. In step 705, a call record is received from either NCP 119 or call data filter 121. The call records are supplied from a) NCP 119 in steps 605, 607, 609, 615, 619 and 621 of the process shown in FIG. 6, b) from call data filter 121 in step 413 of the process shown in FIG. 4, and c) from either NCP 119 or call data filter 121 in step 663 of the process shown in FIG. 13.

Conditional branch point 707 tests to determine if the call record received in step 705 is a queued call record (Table 4). If the test result in step 707 is YES, control passes to step 709, in which the queued call record is saved. Queued call records are saved only for a specified time. The time specified is the maximum time that it is estimated that a caller would remain on hold before terminating a call. An exemplary value of the specified time is 30 minutes. Thereafter, control passes back to step 705.

TABLE 7

| | Traffic Summary Record |
|---|---|
| T_STAMP | Time stamp - Chronological interval that the data covers. |
| DATA_PER | Data Period - Length of time that the data covers. |
| DIAL_NUM | Dialed Number - Caller-dialed digits common to calls in this record (or surrogate if unavailable). |
| TREAT_LABL | Treatment Label - Label for routing telephone number, unrouted disposition, or terminating announcement. |
| ORIG_LABL | Origin Label - Redirection label or caller's area code or country label. |
| CALL_CNT | Call Count - Number of calls that had the same dialed number, treatment, and origin, for the chronological interval. |
| FAIL_CNT | Failure Count - Number of calls that (a) had the same dialed number, treatment, and origin, for the chronological interval, and (b) were routed to a location predicted to be available but later found to be unavailable. |

If the test result in step 707 is NO, control passes to step 711, in which call data processor 123 tests to determine if the received call record is a dequeued call record (Table 5). If the test result in step 711 is YES, control passes to conditional branch point 713, which tests to determine if there can be found a queued call record that has the same CALL_ID as the dequeued call record. If the test result in step 713 is NO, control passes to step 715, in which the dequeued call record is dropped. Thereafter, control passes back to step 705. If the test result in step 713 is YES, i.e., there is a queued call record that has the same CALL_ID as the dequeued call record, control passes to step 717. If the test result in step 711 is NO, indicating that the received call record in step 705 is neither a queued call record nor a dequeued call record, control passes to step 717 directly.

In step 717, the value of the specific DIAL_ID field of the received call record is translated to its equivalent specific DIAL_NUM, and in step 719, call data processor 123 translates TREAT_ID to TREAT_LABL. These steps are based on the dialed number translations and location translations that call data processor 123 received in step 305 of the process shown in FIG. 3. Next, in step 720, call data processor 123 translates CALL_ORIG to ORIG_LABL. This step is necessary if, for example, the call originated outside the North American Numbering Plan and the proprietary code used by IXC network 113 to indicate the country of origin must be translated to a non-proprietary designation for that country. Next, conditional branch point 721 tests to determine if there is a traffic summary record that already exists for the current period that has the same DIAL_NUM, TREAT_LABL and ORIG_LABL as the call record being processed. If the test result in step 721 is NO, control passes to step 723, in which a traffic summary record is created having the same values for DIAL_NUM, TREAT_LABL and ORIG_LABL as the call record being processed. The FAIL_CNT and CALL_CNT fields of the new traffic summary record are set to zero. Control then passes to step 725. If the test result in step 721 is NO, control passes to step 725 directly.

Conditional branch point 725 tests to determine if the call record being processed is a failed call record. If the test result in step 725 is YES, control passes to step 727, in which the FAIL_CNT field of the traffic summary record is incremented. Control then passes to step 731. If the test result in step 725 is NO, i.e., the current call record is not a failed call record, control passes to step 729 in which the value of the CALL_CNT field of the traffic summary record is incremented. Control then passes to step 731.

Figure 8:
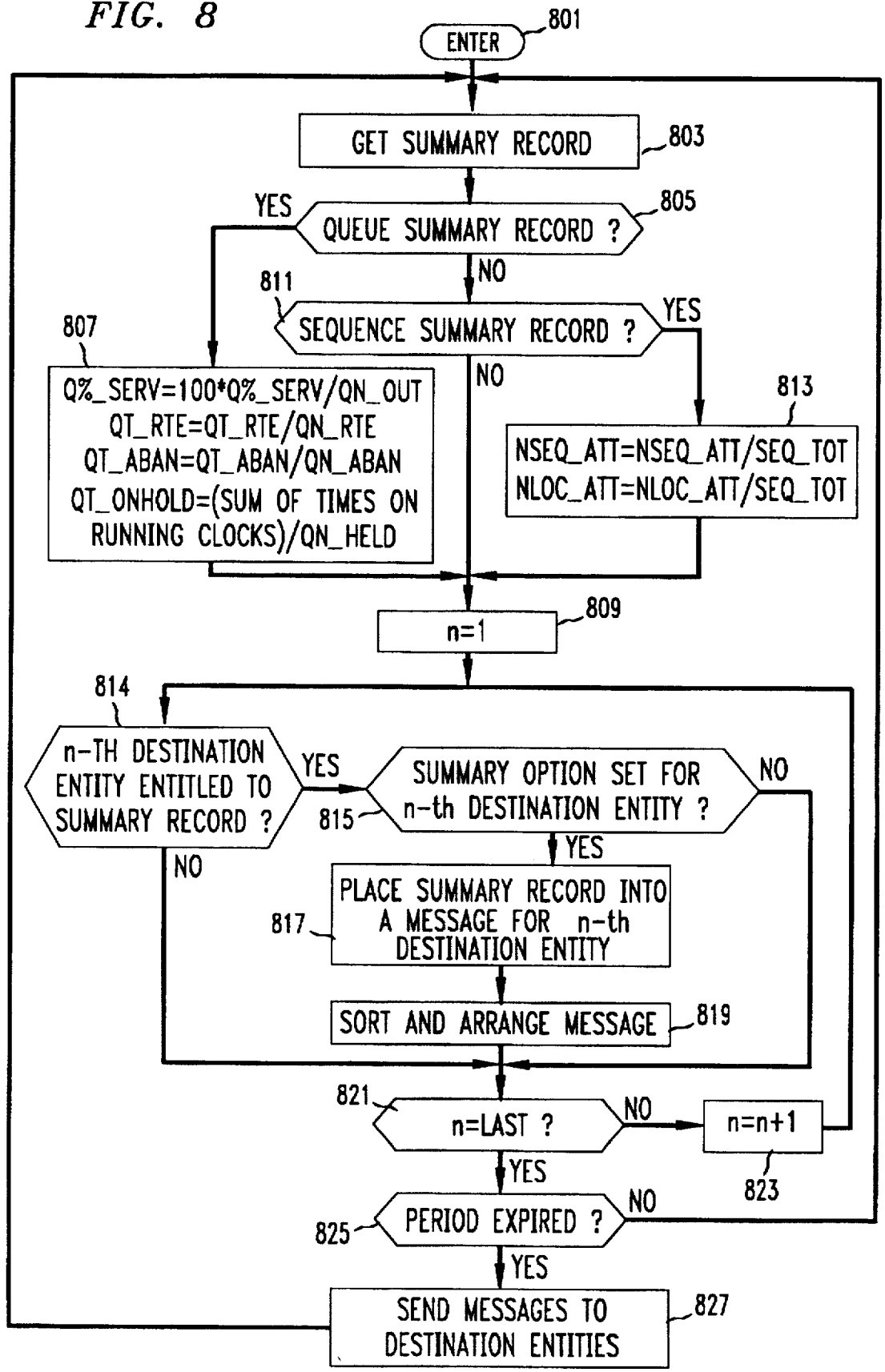
FIG. 8 shows a flow chart of an exemplary message distributor process performed by the call data processor of FIG. 1.

Conditional branch point 731 tests to determine if the current period has expired. If the test result in step 731 is NO, control passes back to step 705. If the test result in step 731 is YES, control passes to step 733 in which access to the traffic summary records developed for the immediately preceding period is made available to a message distributor process in call data processor 123. Such a process is shown in FIG. 8 and described hereinbelow. Thereafter, control passes back to step 705.

Figure 9:
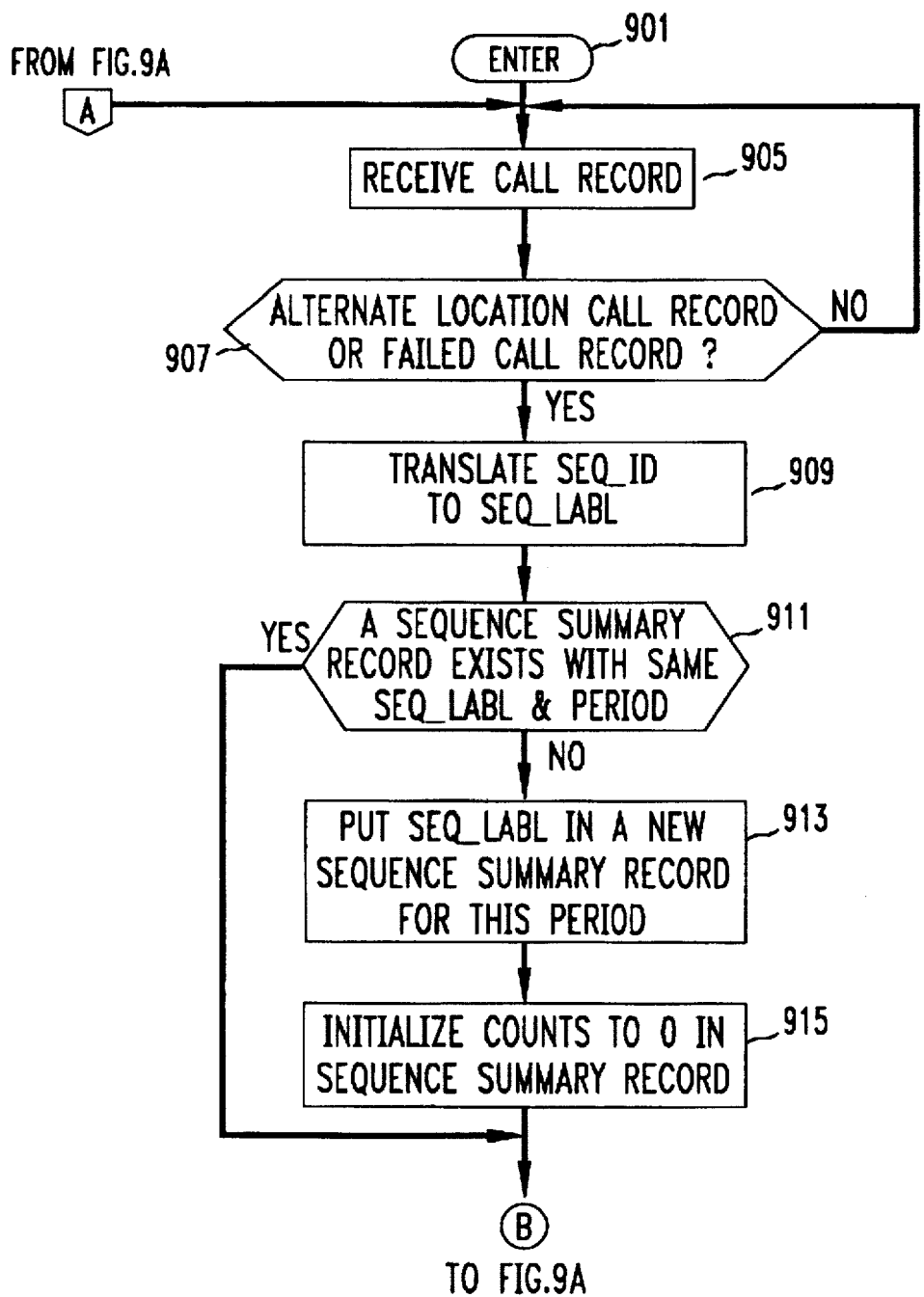
FIGS. 9 and 9A, when connected together, show a flow chart of an exemplary process, continually performed by the call data processor of FIG. 1, for constructing sequence summary records.
Figure 9A:
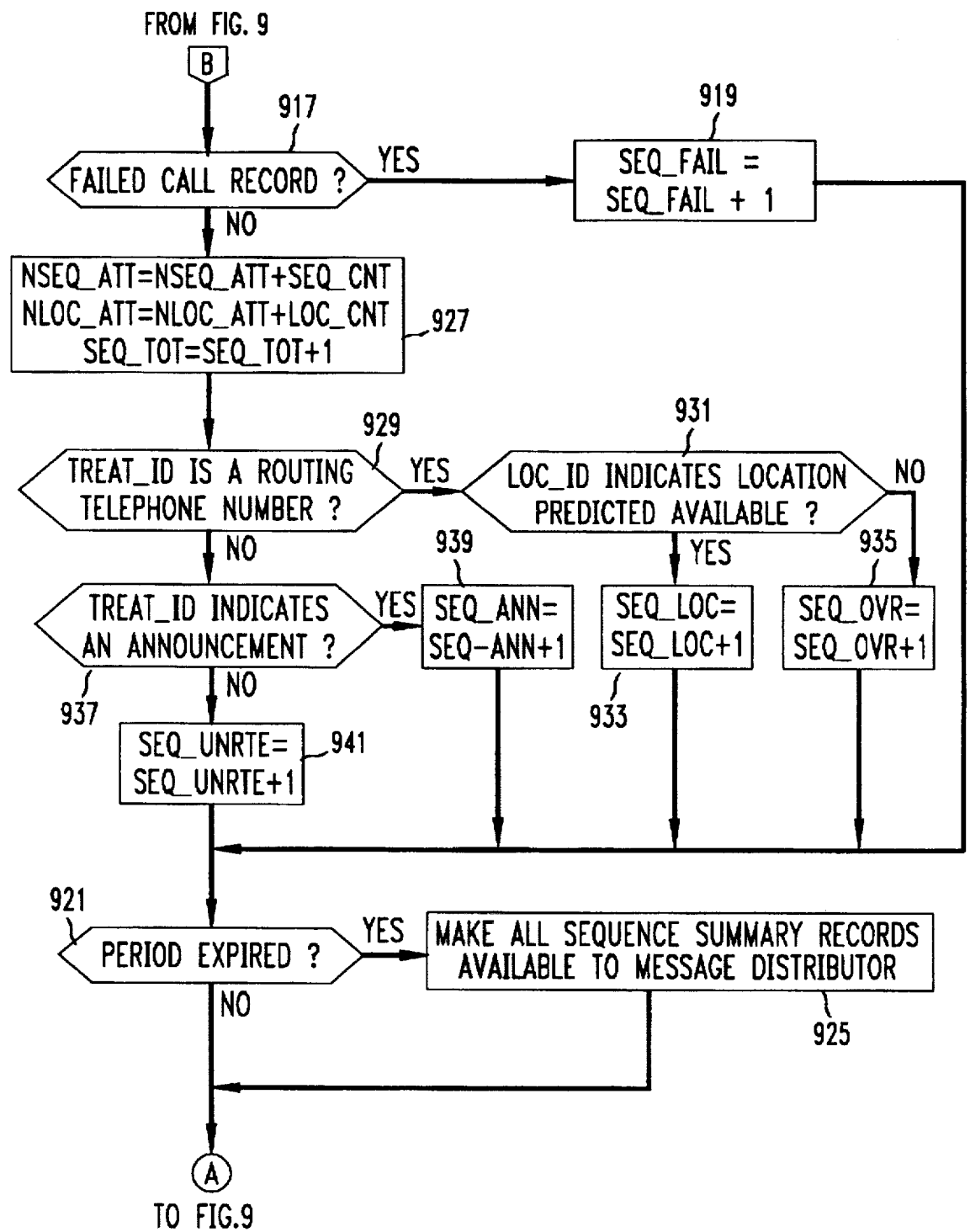

FIGS. 9 and 9A, when connected together, show a flow chart of an exemplary process, continually performed by call data processor 123 (FIG. 1), for constructing sequence summary records. The sequence summary records, shown and defined in Table 8, are constructed using the alternate location call record shown in Table 3 and the failed call record shown in Table 6. The process is entered in step 901 (FIG. 9) when call data processor 123 is started. The process shown restarts periodically. Again, the typical period is three minutes.

In step 905, a call record is received from NCP 119. The call records are supplied from NCP 119 in steps 619 and 615 of FIG. 6. Conditional branch point 907 tests to determine if the call record received in step 905 is an alternate location call record or a failed call record. If the test result in step 907 is NO, control passes back to step 905. If the test result in step 907 is YES, control passes to step 909, in which call data processor 123 translates the value of the SEQ_ID field of the received call record into a value that can be stored in the SEQ_LABL field of the sequence summary record. The mapping for this translation was previously supplied by support system 127, in step 517 of FIG. 5. Control then passes to step 911.

TABLE 8

| | Sequence Summary Record |
|---|---|
| T_STAMP | Time stamp - Chronological interval that the data covers. |
| DATA_PER | Data Period - Length of time that the data covers. |
| SEQ_LABL | Sequence Label - Label that identifies a particular sequence of alternate locations. |
| NSEQ_ATT | Number of Sequences Attempted - For calls that had this sequence as the last one, the number of sequences attempted, on average, over the chronological interval. |
| NLOC_ATT | Number of Locations Attempted - For calls that had this sequence as the last one, the number of locations attempted in all sequences attempted, on average, over the chronological interval. |
| SEQ_TOT | Sequence Total - Number of calls in the chronological interval for which this sequence was the last one attempted. |
| SEQ_LOC | Sequence to Location - Subtotal of SEQ_TOT including only the calls actually routed to a location in this sequence. |
| SEQ_OVR | Sequence to Overflow - Subtotal of SEQ_TOT including only the calls routed to an overflow location not in this sequence. |
| SEQ_ANN | Sequence to Announcement - Subtotal of SEQ_TOT including only the calls sent to an announcement because all the locations were predicted to be unavailable. |
| SEQ_UNRTE | Sequence Unrouted - Subtotal of SEQ_TOT including only the calls not routed to any location nor sent to an announcement. |
| SEQ_FAIL | Sequence Failures - Number of calls found, during the chronological interval, to have been routed to a location in this sequence which, contrary to prediction, was unavailable. |

Conditional branch point 911 tests to determine if a sequence summary record exists that has the same value for its SEQ_LABL field for the current time period as the translated value. If the test result is NO, control passes to step 913, in which the resulting, translated SEQ_LABL field value from the call record is placed in a new sequence summary record for the time period. Next, in step 913, all the fields of the new sequence summary record created in step 913, except the T_STAMP, DATA_PER and SEQ_LABL fields are initialized to zero. Control then passes to conditional branch point 917. If the test result in step 911 is YES, i.e., a sequenced summary record exists that has the same value in its SEQ_LABL field as the translated SEQ_ID field of the call record for the current time period, control passes directly to step 917.

Conditional branch point 917 tests to determine if the just received call record is a failed call record (Table 6). If the test result 917 is YES, control passes to step 919 in which the SEQ_FAIL field of the sequence summary record is incremented. Control then passes to conditional branch point 921, which tests to determine if the current period has expired. If the test result in step 921 is NO, control passes back to step 905. If the test result in step 921 is YES, control passes to step 925. In step 925, all the sequence summary records are made available by call data processor 123 to its message distributor process shown in FIG. 8 and described hereinbelow. Control then passes back to step 905.

If the test result in step 917 is NO, i.e., the just received call record is an alternate location call record (Table 3), control passes to step 927, in which NSEQ_ATT is set equal to NSEQ_ATT+SEQ_CNT, NLOC_ATT is set equal to NLOC_ATT+LOC_CNT and SEQ_TOT is incremented. During the period, NSEQ_ATT accumulates the total number of alternate sequences that NCP 119 used to select routing numbers for calls. NLOC_ATT accumulates the total number of locations that NCP 119 evaluated for the call. The accumulated totals are converted to a per call average at the end of the period. See step 813 of FIG. 8 described hereinbelow. Conditional branch point 929 tests to determine if the value stored in the TREAT_ID field is a routing telephone number, i.e., was the call actually routed to a particular telephone number. If the test result in step 929 is YES, control passes to conditional branch point 931, which tests to determine if the value stored in the LOC_ID field indicates that NCP 119 has predicted that the location to which the call was routed is available. If the test result in step 931 is YES, control passes to step 933, in which the value of the SEQ_LOC field of the sequence summary record is incremented. Control then passes to step 921 and the process proceeds as described as above. If the test result in step 931 is NO, control passes to step 935 in which SEQ_OVR is incremented. Again, control then passes to step 921 and the process proceeds as described above.

If the test result in step 929 is NO, i.e., the call was not routed, control passes to conditional branch point 937, which tests to determine if the value stored in the TREAT_ID field indicates that the caller was connected to an announcement facility. If the test result in step 937 is YES, control passes to step 939, in which the value of the SEQ_ANN field of the sequence summary record is incremented. Control then passes to step 921 and the process proceeds as described above. If the test result in step 937 is NO, control passes to step 941, in which the value of the SEQ_UNRTE field is incremented. Control then passes to step 921 and the process proceeds as described above.

Figure 10:
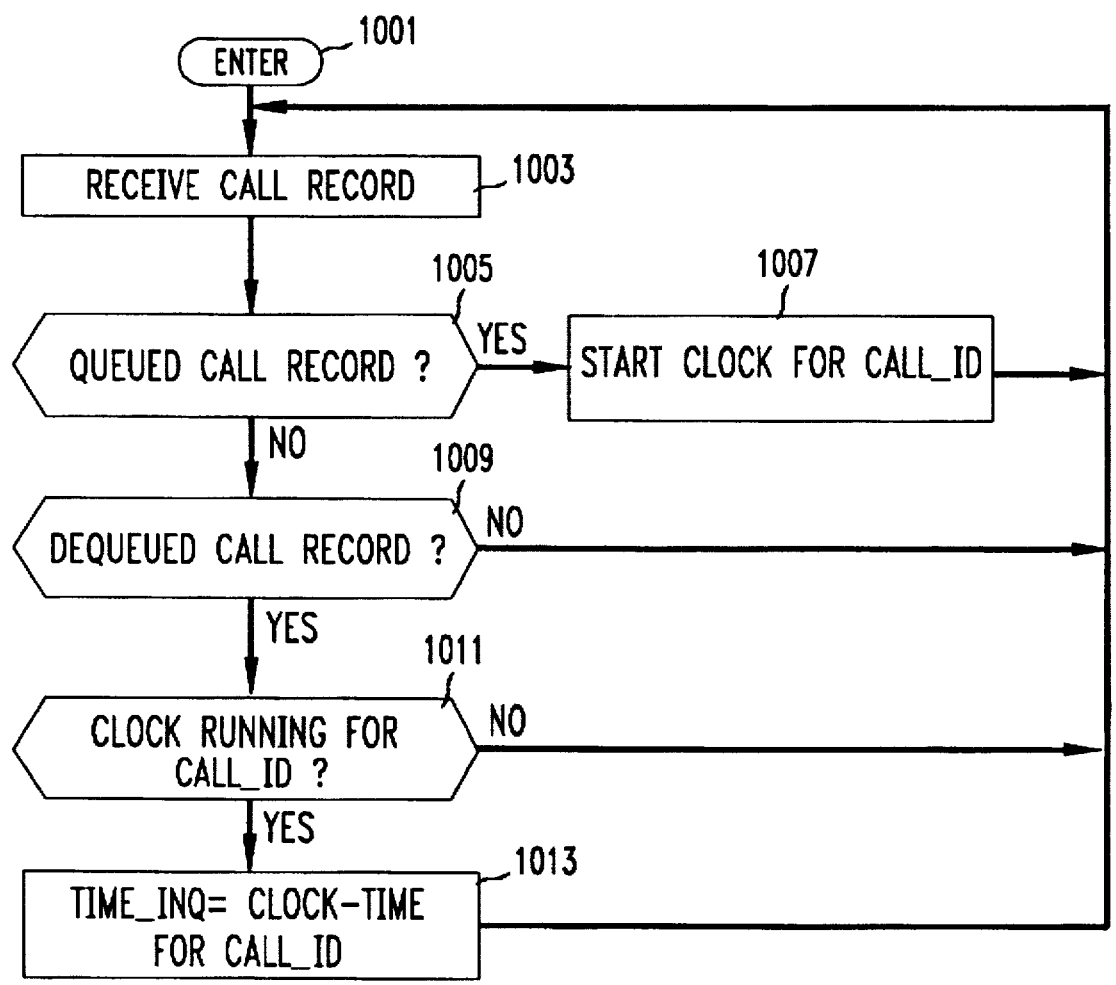
FIG. 10 shows a flow chart of an exemplary process for determining how long a queued call remained in the queue.

FIG. 10 shows a flow chart of an exemplary process for determining how long a queued call remained in the queue. The process is entered in step 1001, when call data processor 123 is started. The process determines the length of the period between reception of a queued call record (Table 4) and its corresponding dequeued call record (Table 5).

In step 1003 a call record is received. Next, conditional branch point 1005 tests to determine if the received call record is a queued call record. If the test result in step 1005 is YES, control passes to step 1007, in which a clock for the call, i.e., a clock identifiable by the CALL_ID field of the queued call record, is started. Control then passes back to step 1001.

If the test result in step 1005 is NO, conditional branch point 1009 tests to determine if the received call record is a dequeued call record. If the test result in step 1009 is NO, control passes back to step 1003. If the test result in step 1009 is YES, control passes to step 1011.

Conditional branch point 1011 tests to determine if there is a clock running that is identified by the CALL_ID field of the dequeued call record. If the test result in step 1011 is YES, a variable, TIME_INQ, is associated with the dequeued call record and is set to the value of the clock identified by the CALL_ID field of the dequeued call record, in step 1013. Control then passes back to step 1003. If the test result in step 1011 is NO, control passes back to step 1003 directly.

Figure 11:
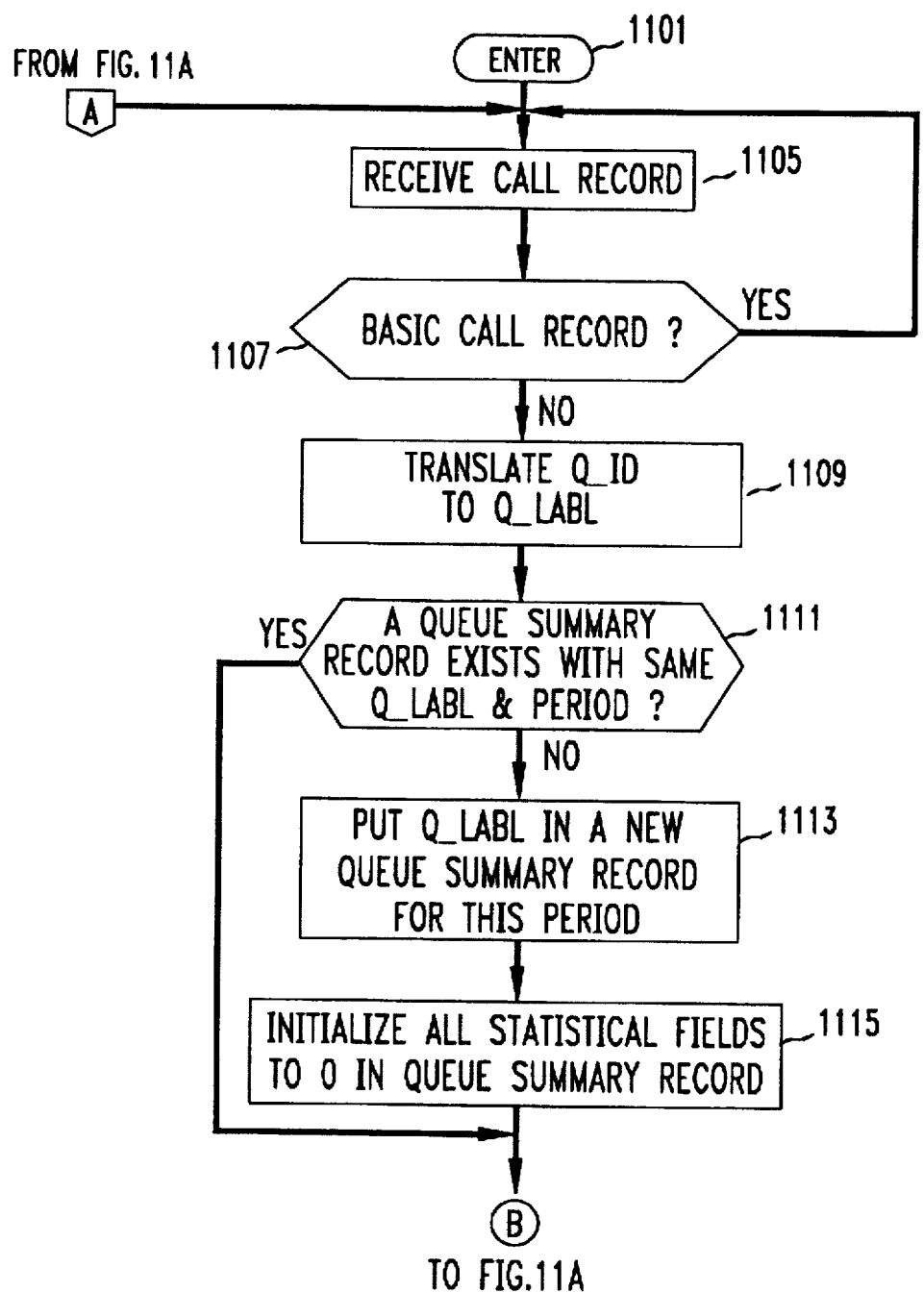
FIGS. 11 and 11A, when connected together, show a flow chart of an exemplary process, continually performed by the call data processor of FIG. 1, for constructing queue summary records.
Figure 11A:
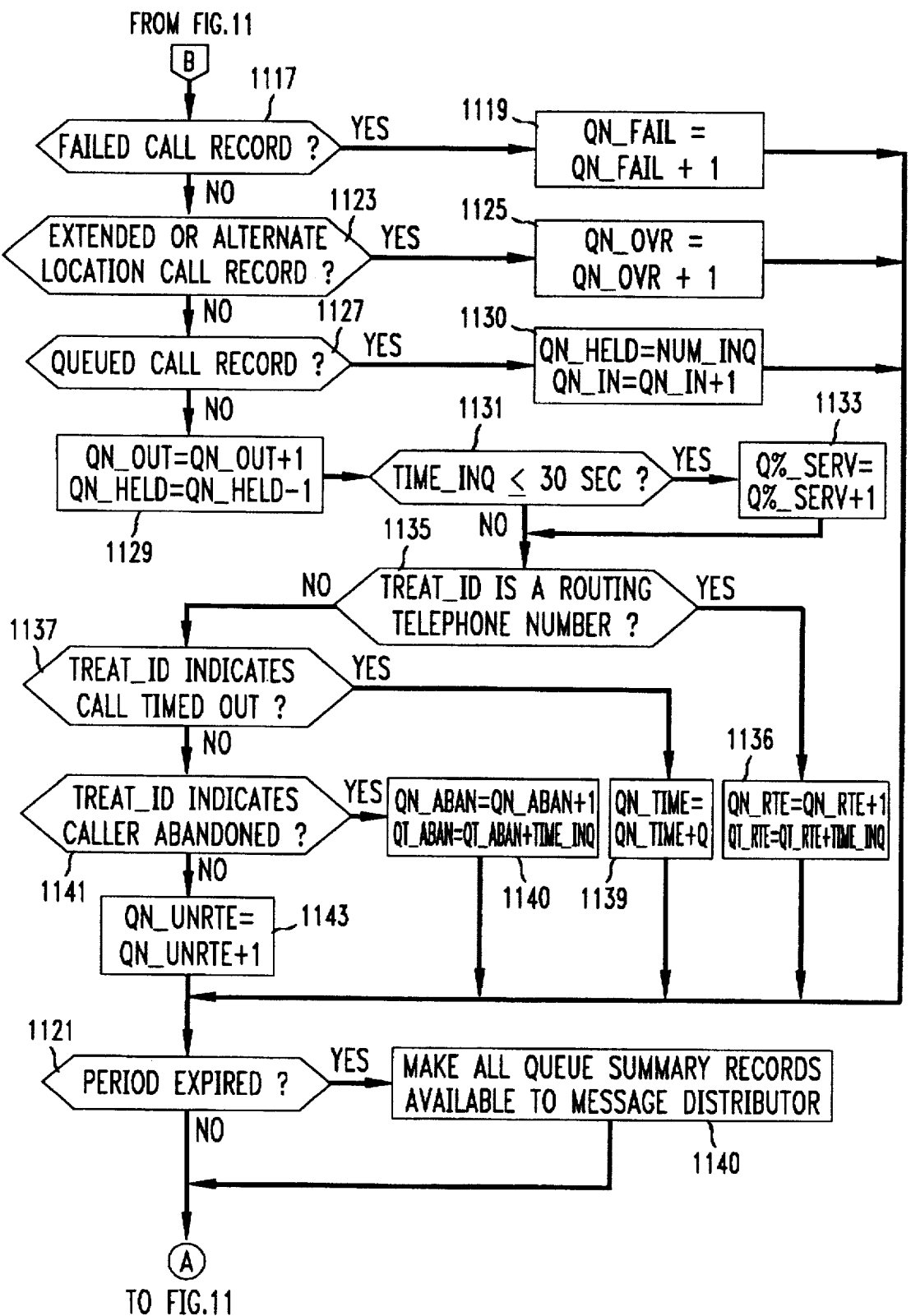

FIG. 11 shows a flow chart of an exemplary process, continually performed by call data processor 123 (FIG. 1), for constructing queue summary records. The queue summary records, shown and defined in Table 9, are constructed using all of the types of call records except for the basic call record. The process is entered in step 1101 (FIG. 11) when call data processor 123 is started. The process shown restarts periodically. Again, a typical period is three minutes.

In step 1105, a call record is received from either NCP 119 or call data filter 121. NCP 119 supplies call records in steps 605, 609, 615, 619 and 621 of the process shown in FIG. 6. Call data filter 121 supplies call records in step 413 of the process shown in FIG. 4.

Next, conditional branch point 1107 tests to determine if the call record received in step 1105 is a basic call record (Table 1). If the test result in step 1107 is YES, control passes back to step 1105. If the test result in step 1107 is NO, in step 1109, call data processor 123 translates the Q_ID field of the call record to a corresponding Q_LABL value, which is a field in the queued summary record. The translation is performed by using the queue translations that call data processor 123 received in step 517 of the process shown in FIG. 5.

Next, conditional branch point 1111 tests to determine if for the current period there exists a queued summary record having the same value in its Q_LABL field as the value of the translated Q_ID field. If the test result in step 1111 is YES, control passes to step 1117. If the test result in step 1111 is NO, control passes to step 1113 in which call data processor 123 creates, for the current period, a new queue summary record that has the value of the translated Q_ID field as its value of Q_LABL. Thereafter, in step 1115, all the statistical fields of the new queue summary record, QN_OVR, QN_IN, QN_OUT, QN_RTE, QN_TIME, QN_ABAN, QN_UNRTE, QN_FAIL, QN_HELD, Q%_SERV, QT_RTE, QT_ONHOLD, QT_ABAN, are initialized to zero. Control then passes to step 1117.

Conditional branch point 1117 tests to determine if the received call record is a failed call record (Table 6). If the test result in step 1117 is YES, control passes to step 1119, in which the value of the QN_FAIL statistical field of the queue summary record is incremented. Control then passes to step 1121. If the test result in step 1117 is NO, control passes to conditional branch point 1123, which tests to determine if the received call record is either an extended (Table 2) or an alternate (Table 3) location call record. If the test result in step 1123 is YES, control passes to step 1125, in which the value of the QN_OVR statistical field of the queue summary record is incremented. Control then passes to step 1121.

If the test result in step 1123 is NO, control passes to conditional branch point 1127, which tests to determine if the received call record is a queued call record (Table 4). If the test result in step 1127 is YES, control passes to step 1130, in which the value of the QN_HELD statistical field of the queue summary is set equal to NUM_INQ of the queued call record. Also, the value of the QN_IN statistical field of the queue summary record is incremented. If the test result in step 1127 is NO, the received call record is a dequeued call record (Table 5). Control therefore passes to step 1129, in which the value of statistical field QN_OUT is incremented and that of QN_HELD is decremented. Control then passes to step 1131.

Conditional branch point 1131 tests to determine if the value of TIME_INQ for the dequeued call record, which was computed in step 1013 of the process shown in FIG. 10, is less than a predetermined acceptable waiting time in the queue, e.g., 30 seconds. If the test result in step 1131 is YES, control passes to step 1133, in which the value of Q%_SERV statistical field of the queue summary record is incremented. Control then passes to step 1135. If the test result in step 1131 is NO, control passes to step 1135 directly.

Conditional branch point 1135 tests to determine if the value stored in the TREAT_ID field of the dequeued call record is a telephone number to which the call can be routed. If the test result in step 1135 is YES, control passes to step 1136, in which the value of the QN_RTE statistical field of the queue summary record is incremented and the value of the QT_RTE field is increased by the value of the timer associated with the dequeued call record, TIME_INQ. Control then passes to step 1121. If the test result in step 1135 is NO, control passes to step 1137, which tests to determine if the value stored in the TREAT_ID field of the dequeued call record indicates that the call timed out, i.e., the call exceeded the maximum time that an NCP will allow a call to remain in the queue without being dropped. If the test result in step 1137 is YES, control passes to step 1139, in which the value of the QN_TIME statistical field of the queue summary record is incremented. Control then passes to step 1121. If the test result in step 1137 is NO, control passes to step 1141.

Conditional branch point 1141 tests to determine if the value of the TREAT_ID field of the dequeued call record indicates that the caller abandoned the call. If the test result in step 1141 is YES, the value of the QN_ABAN statistical field of the queue summary record is incremented and the value of the QT_ABAN field is increased by the value of the timer associated with the dequeued call record, TIME_INQ. Control then passes to step 1121. If the test result in step 1141 is NO, control passes to step 1143 in which the value of the QN_UNRTE statistical field of the queue summary record is incremented. Control then passes to step 1121.

Conditional branch point 1121 tests to determine if the current period has expired. If the test result in step 1121 is NO, control passes back to step 1105. If the test result in step 1121 is YES, control passes to step 1140, in which all of the queued summary records are made available by call data processor 123 to its message distributor process shown in FIG. 8 and described hereinbelow.

Figure 12:
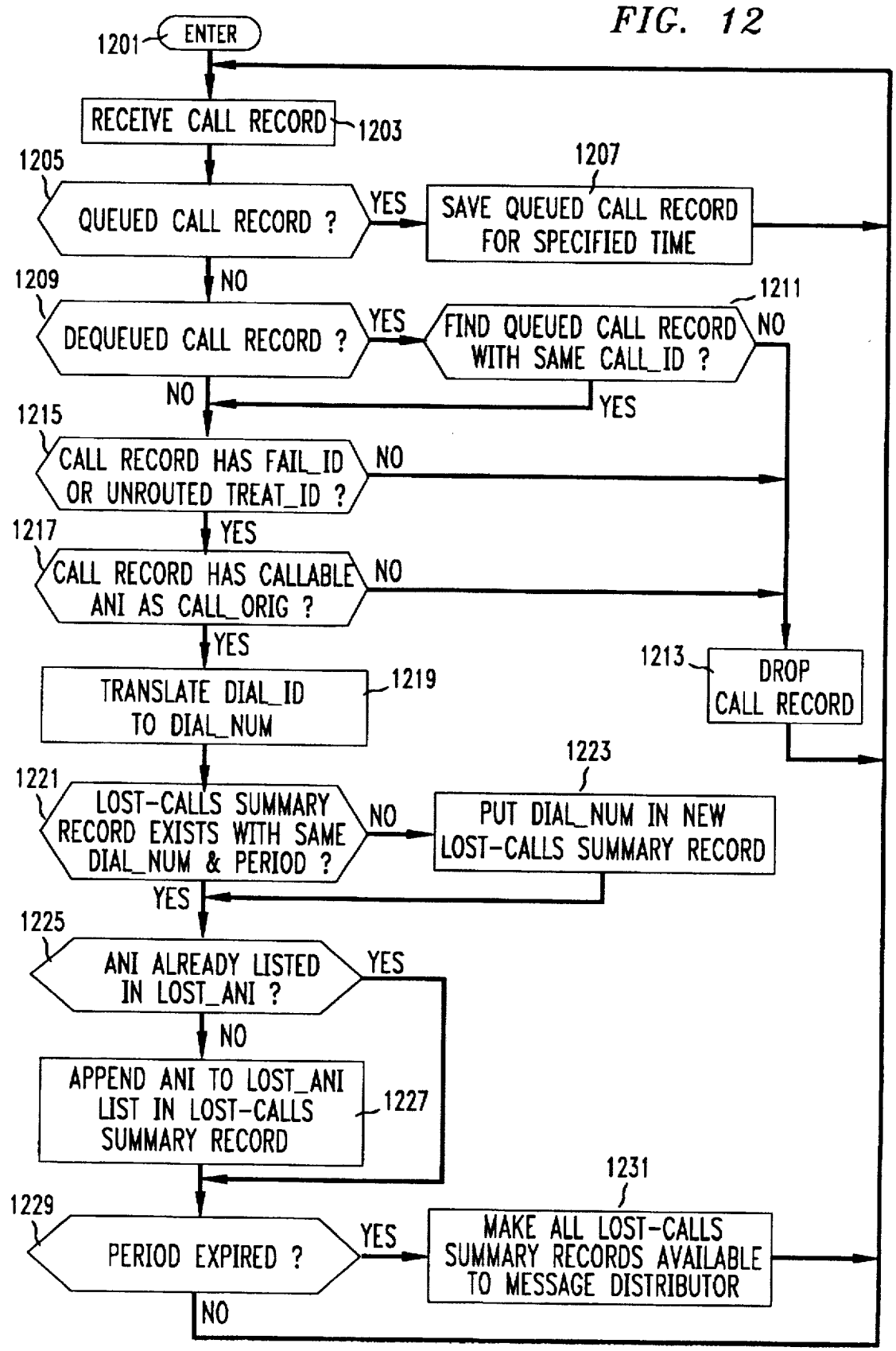
FIG. 12 shows a flow chart of an exemplary process, continually performed by the call data processor of FIG. 1, for constructing lost-calls summary records.

FIG. 12 shows a flow chart of an exemplary process continually performed by call data processor 123 (FIG. 1), for constructing lost-calls summary records. The lost-calls summary records, shown and defined in Table 10, are constructed using all of the types of call records. The process is entered in step 1201 (FIG. 12) when call data processor 123 is started. The process shown restarts periodically. Again, a typical period is three minutes. In step 1203, the call record is received from either NCP 119 or call data filter 121. NCP 119 supplies call records in step 605, 609, 615, and 621 of the process shown in FIG. 6, as noted above. Call data filter 121 supplies call records in step 413 of the process shown in FIG. 4, again, as noted above. NCP 119 and call data filter 123 also supply call records in step 663 of the process shown in FIG. 13.

Next, conditional branch point 1205 tests to determine if the call record received in step 1203 is a queued call record (Table 4). If the test result in step 1205 is YES, control passes to step 1207, in which the queued call record is saved. The queued call records are saved only for specified time. As noted, in connection with step 709 of FIG. 7, queued call records are saved only for a specified time. The time specified is the maximum time that a caller would remain on hold before terminating a call. Again, an exemplary value of the specified time is 30 minutes. Thereafter, control passes back to step 1203.

If the test result in step 1205 is NO, control passes to step 1209, in which call data processor 123 tests to determine if the received call record is a dequeued call record (Table 5). If the test result in step 1209 is YES, control passes to conditional branch point 1211, which tests to determine if there can be found a queued call record that has the same CALL_ID as the dequeued call record. If the test result in step 1211 is NO, control passes to step 1213, in which the dequeued call record is dropped. Thereafter, control passes back to step 1203. If the test result in step 1211 is YES, i.e., there is a queued call record that has the same CALL_ID as the dequeued call record, control passes to step 1215. If the test result in step 1209 is NO, indicating that the received call record in step 1203 is neither a queued call record nor a dequeued call record, control passes to step 1215 directly.

Step 1215 tests to determine if the received call record has a FAIL_ID field, i.e., is the call record a failed call record (Table 6), or is the value of the TREAT_ID field an indication that the call was unrouted. If the test result in step 1215 is NO, control passes to step 1213, in which the call record is dropped. Thereafter, control passes back to step 1203:

If the test result in step 1215 is YES, control passes to conditional branch point 1217, which tests to determine if the value of the call record's CALL_ORIG field is a dialable telephone number, meaning that the number is a number that is valid to be a telephone line according to the North American Numbering Plan, i.e., does it correspond to a callable, automatic numbering identification (ANI) number. If the test result in step 1217 is NO, control passes to step 1213, in which the call record is dropped. Thereafter, control passes back to step 1203.

If the test result in step 1217 is YES, control passes to step 1219 in which the value of the specific DIAL_ID field of the received call record is translated to its equivalent specific DIAL_NUM. Next, conditional branch point 1221 tests to determine if a lost-calls summary record already exits that has the same value in its DIAL_NUM field as the value of the DIAL_NUM field of the just received call record. If the test result in step 1221 is NO, control passes to step 1223 which creates a new lost-calls summary record and places in its DIAL_NUM field the value of the DIAL_NUM field of the received call record. Control then passes to step 1227. If the test result in step 1221 is YES, control passes directly to step 1227. Conditional branch point 1225 tests to determine if the ANI in the CALL_ORIG field of the received call record is already listed in the lost ANI list of the lost-calls summary record. If the test result in step 1225 is NO, control passes to step 1227, in which the ANI from the CALL_ORIG field of the received call record is appended to the LOST_ANI list in the lost-calls summary record. If the test result in step 1225 is YES, control passes to conditional branch point 1229 which tests to determine if the current period has expired. If the test result in step 1229 is NO, control passes back to step 1203. If the test result in step 1229 is YES, control passes to step 1231 in which access to the lost-calls summary records is made available to a message distributor process in call data processor 123. Such a process is shown in FIG. 8 and described herein below. Thereafter, control passes back to step 1203.

TABLE 9

| | Queue Summary Record |
|---|---|
| T_STAMP | Time stamp - Chronological interval that the data covers. |
| DATA_PER | Data Period - Length of time that the data covers. |
| Q_LABL | Queue Label - Label that identifies a particular queue. |
| QN_OVR | Queue Overflow - Number of calls that could not be placed on this queue in the chronological interval because the queue was full. |
| QN_IN | Queue In - Number of calls that were placed on this queue in the chronological interval. |
| QN_OUT | Queue Out - Number of calls that left this queue in the chronological interval. |
| QN_RTE | Routed from Queue - Subtotal of QN_OUT including only the calls actually routed to a location on leaving this queue. |
| QN_TIME | Queue Timed Out - Subtotal of QN_OUT including only the calls that left the queue during the chronological interval because a time-limit expired. |
| QN_ABAN | Queue Abandons - Subtotal of QN_OUT including only the calls that left the queue during the chronological interval because the caller abandoned. |
| QN_UNRTE | Queue Unrouted - Subtotal of QN_OUT including only the calls not routed to any location, nor timed out, nor abandoned. |
| QN_FAIL | Queue Failures - Number of calls that left this queue and and were found, during the chronological interval, to have been routed to a location which, contrary to prediction, was unavailable. |
| QN_HELD | Held in Queue - Number of calls held in this queue at the end of the chronological interval. |
| Q%_SERV | Service Level in Queue - The percent of queued calls that |

TABLE 9-continued

Queue Summary Record

|  |  |
|---|---|
|  | left the queue and were routed to a location within a specified time (e.g., 30 seconds). |
| QT_RTE | Queued Time for Routed Calls - The average time between entering and exiting this queue, for calls that exited during the chronological interval. |
| QT_ONHOLD | Queued Time for Calls on Hold - The average time between entering this queue and the end of the chronological interval, for calls then in the queue. |
| QT_ABAN | Queued Time for Abandoned Calls - The average time between entering this queue and abandoning, for calls that abandoned during the chronological interval. |

TABLE 10

Lost-Calls Summary Record

| | |
|---|---|
| T_STAMP | Time stamp - Chronological interval that the data covers. |
| DATA_PER | Data Period - Length of time that the data covers. |
| DIAL_NUM | Dialed Number - Caller-dialed digits common to calls in this record (or surrogate if unavailable). |
| LOST_ANI | Lost Callers' ANI - A list of the ANIs for calls which, for this dialed number, were unrouted, abandoned, timed out, or otherwise failed during the chronological interval. |

FIG. 8 shows a flow chart of an exemplary message distributor process performed by call data processor 123 at the conclusion of a period. The message distributor process can take no more time to complete its function than the length of one period. Accordingly, the process is entered in step 801 at the conclusion of the preceding period of the process for constructing traffic summary records shown in FIG. 7. In step 803, the message distributor processor gets the next summary record from those that were generated in the preceding period after which they were made available to the message distributor process. The processes shown in FIGS. 7, 9 and 9A, 11 and 11A, and 12, executed in call data processor 123, generate summary call records and make them available to the message distributor processor in steps 733, 925, 1140 and 1231, respectively.

Conditional branch point 805 tests to determine if the summary record is a queue summary record. If the test result in step 805 is YES, the statistics for the queue indicated in the queue summary record are computed. Accordingly, in step 807, the percentage of queued calls that left the queue and were routed to a location within the predetermined time is computed by dividing Q%_SERV, which has been accumulating the number of calls so completed, by QN_OUT, which is the total number of calls that left the queue in any manner and multiplying by 100 to obtain a percent. The time waiting in queue, for routed calls from the particular queue, QT_RTE, is computed by dividing the accumulated time currently stored in the QT_RTE field by the number of calls that were routed from the queue, stored in the QN_RTE field. The time that abandoned calls spent waiting in the particular queue, QT_ABAN, is computed by dividing the accumulated time currently stored in the QT_ABAN field by the number of calls that were abandoned, stored in the QN_ABAN field. Also, the average time a call is held in the queue, for the preceding period, is computed as the quotient of QT_ONHOLD, the sum of the times of the running clocks, and QN_HELD, the number of calls that were placed on hold. The running clocks are those clocks that were started in step 1007 of the process shown in FIG. 10 and for which a dequeued call record (Table 5) has not been received yet, so that the clock time is still increasing. Thereafter, control passes to step 809.

If the test result in step 805 is NO, control passes to conditional branch point 811, which tests to determine if the summary record is a sequence summary record. If the test result in step 811 is YES, control passes to step 813, in which the value of the NSEQ_ATT field of the sequence summary record is set equal to NSEQ_ATT/SEQ_TOT and the value of the NLOC_ATT field is set equal to NLOC_ATT/SEQ_TOT in step 923. As defined in Table 8, these values represent the average number of sequences that NCP 119 used to select a routing number for calls processed during the immediately preceding period and the average number of locations that NCP 119 evaluated for those same calls. Thereafter, control passes to step 809. If the test result in step 805 is NO, control passes to step 809 directly.

In step 809, a counter variable, n, is initialized to one. Next, conditional branch point 814 tests to determine if the n-th destination entity is entitled to the information in the summary record. A destination entity is entitled to a summary record if, for example, it contains information about a dialed number for telephone calls routed to the destination entity or about a queue in which such calls were held. If the test result in step 814 is NO, control passes to step 821, described below. If the test result in step 814 is YES, control passes to step 815.

Conditional branch point 815 tests to determine if the n-th destination entity has requested, as an option, to receive summary records of a given type. The setting of such an option was determined in step 203 of the process shown in FIG. 2. A destination entity may, for example, set an option to receive traffic summary records, but not to receive other types of summary records. If the test result in step 815 is YES, control passes to step 817, in which the information from the summary record is placed into a message to be sent to the n-th destination entity. Thereafter, in step 819, the messages for each destination entity are sorted and arranged according to the predetermined criteria supplied by that destination entity. Control then passes to step 821. If the test result in step 815 is NO, control passes to step 821 directly.

Conditional branch point 821 tests to determine if n is equal to the value of the last destination entity. If the test result in step 821 is NO, the value of n is incremented in step 823, and control passes back to step 814. If the test result in step 821 is YES, control passes to step 825.

Conditional branch point 825 tests to determine if the current period has expired. If the test result in step 825 is NO, control passes back to step 803. If the test result in 825 is YES, control passes to step 827, in which the messages that were developed in step 817 are sent to their respective destination entities. Thereafter, control passes back to step 803.

Tables 11, 12 and 13 show exemplary screens of information that can be supplied to destination entities by call data processor 123. Such information would be displayed on a terminal of a destination entity, e.g., terminal 1044 of customer A 103. Table 11 shows a display of several exemplary traffic summary records (Table 7). Table 12 shows a display of several exemplary sequence summary records (Table 8). Table 13 shows a display of selected fields from several exemplary queue summary records (Table 9).

TABLE 11

TRAFFIC DATA

Tues Jul 21, 1992

| Time | DIAL_NUM | TREAT_LABL | ORIG_LABL | CALL_CNT | FAIL_CNT |
|---|---|---|---|---|---|
| 13:00 | 800-555-1111 | NewYork | 908 | 45 | 1 |
| | | | 609 | 35 | 0 |
| | 800-555-2222 | Chicago | 410 | 55 | 0 |
| | | | RED | 20 | 0 |
| | | Annce21 | 609 | 5 | 0 |
| | | Abandon | 215 | 3 | 0 |
| | | | 609 | 2 | 1 |

TABLE 12

ALTERNATE SEQUENCE DATA
Tues Jul 21, 1992

| | | Routed | | | | Unrouted | | Avg Attempts | |
|---|---|---|---|---|---|---|---|---|---|
| Time | SEQ_LABL | SEQ_TOT | SEQ_LOC | SEQ_OVR | SEQ_FAIL | SEQ_ANN | SEQ_UNRTE | NSEQ_ATT | NLOC_ATT |
| 13:00 | Primary | 125 | 64 | 36 | 5 | 10 | 10 | 1.00 | 4.20 |
| | Backup1 | 227 | 125 | 75 | 2 | 20 | 5 | 2.00 | 11.51 |
| | Backup2 | 120 | 74 | 26 | 0 | 10 | 10 | 2.30 | 6.70 |
| 13:03 | Primary | 145 | 83 | 36 | 6 | 10 | 10 | 1.00 | 3.81 |
| | Backup1 | 220 | 125 | 70 | 2 | 18 | 5 | 1.90 | 9.80 |
| | Backup2 | 105 | 60 | 35 | 0 | 10 | 0 | 2.51 | 4.30 |

TABLE 13

QUEUE DATA (OVERVIEW REPORT)
Tues Jul 21, 1992

| Time | Q_LABL | QN_IN | QN_OUT | QN_OVR | QN_FAIL | QN_HELD | QT_RTE | Q %_SERV |
|---|---|---|---|---|---|---|---|---|
| 13:00 | NewYork | 10000 | 9000 | 50 | 2 | 500 | 00:28 | 75% |
| | Chicago | 20000 | 19050 | 150 | 0 | 750 | 00:35 | 66% |
| | FtWorth | 8000 | 7500 | 40 | 1 | 600 | 00:29 | 82% |
| 13:03 | NewYork | 11000 | 8500 | 33 | 1 | 450 | 00:29 | 82% |
| | Chicago | 19000 | 20040 | 90 | 0 | 400 | 00:20 | 87% |
| | FtWorth | 7700 | 7300 | 30 | 3 | 800 | 00:41 | 71% |

Figure 14:
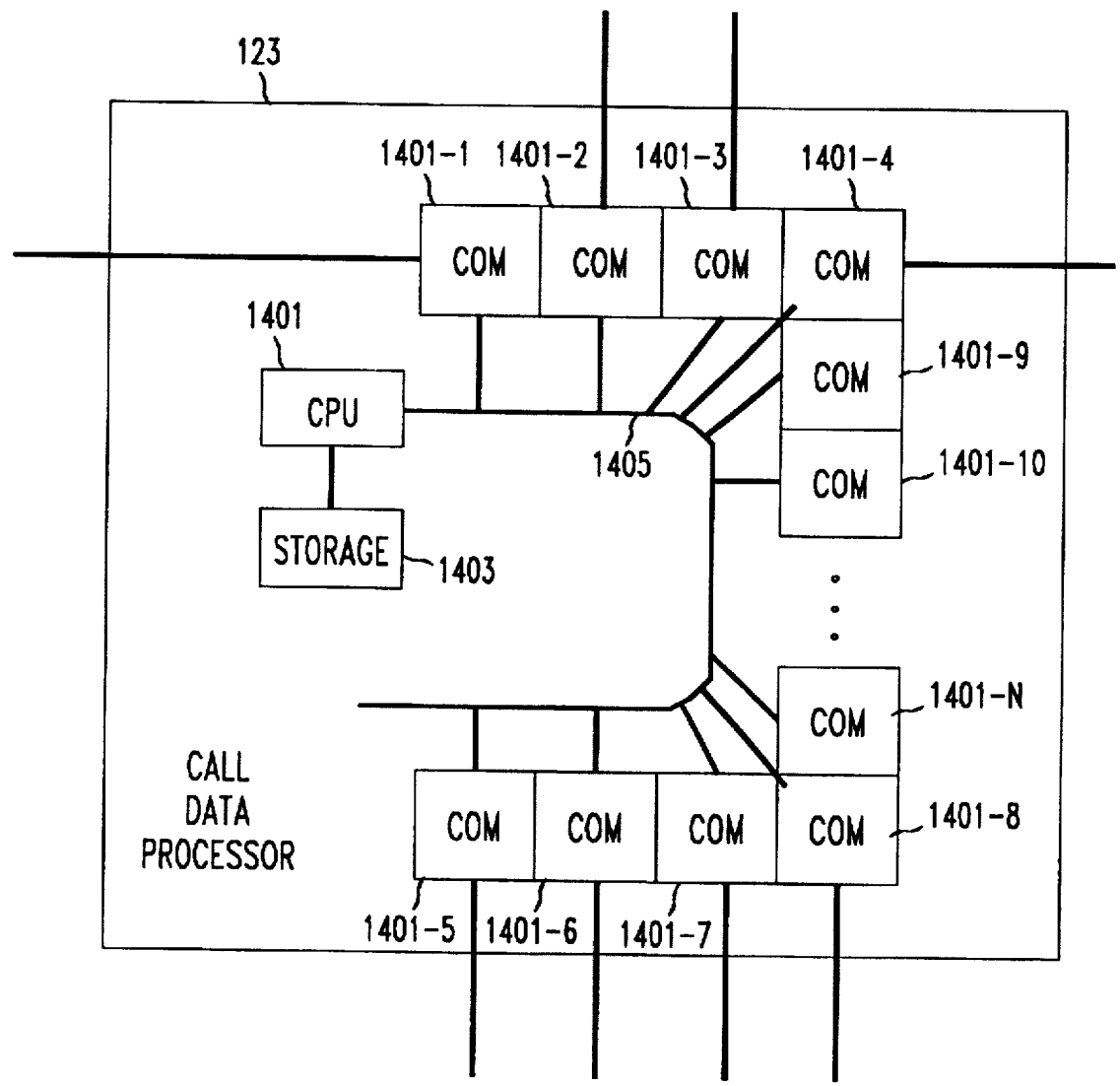
FIG. 14 shows, in simplified block diagram form, an exemplary call data processor, in accordance with the principles of the invention.

FIG. 14 shows, in simplified block diagram form, an exemplary structure of call data processor 123 (FIG. 1), in accordance with the principles of the invention. Central processing unit (CPU) 1401 is connected to storage 1403, which stores programs and data to carry out the processes described above, and to bus 1405. Bus 1405, in turn, connects central processing unit (CPU) 1401 to each of a plurality of communications interfaces (COM) 1407-1 through 1407-N, which need not be identical. Each of communications interfaces (COM) 1407-1 through 1407-N is capable of interfacing with at least one of a) the equipment located at a destination entity, b) a call data filter, c) an NCP such as NCP 119 (FIG. 1) or d) a support system. Communications interfaces are well known in the art.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in monitoring call attempts processed by the network of an interexchange carrier in which the switches of said network route said call attempts in response to received instructions, the method characterized by the steps of:

collecting, at a call data processor of said interexchange carrier, information relating to call attempts placed to at least one destination entity, said collecting being performed for each respective one of said call attempts prior to any routing of it by any of said switches; and periodically supplying to said destination entity information relating to call attempts placed to said at least one destination entity as it is collected without waiting for the termination of said call attempts, said supplying being independent of said call attempts for which said information is collected in said collecting step and said supplied information including at least a portion of said information collected in said collecting step.

2. The invention as defined in claim 1 wherein said information collected in said collecting step includes information about call attempts for which none of said switches of said network of said interexchange carrier was ever able to route to a location of said destination entity prior to their termination.

3. The invention as defined in claim 1 wherein the information supplied in said supplying step pertains to at least one call attempt that has not terminated.

4. The invention as defined in claim 1 wherein said information collected in said collecting step includes information about a particular call attempt that is held in a queue in said network of said interexchange carrier prior to having any routing performed for it.

5. The invention as defined in claim 1 further including the step of:

collecting information relating to calls placed to said destination entity that were rerouted to at least one alternate location of said destination entity because said network of said interexchange carrier was unable to complete them to a first location to which they were initially routed and wherein said information supplied in said step of supplying also includes at least a portion of said information collected about said rerouted calls.

6. The invention as defined in claim 5 further including the step of:

collecting information relating to calls placed to said destination entity that were completed to a first location of said destination entity to which they were routed and wherein said information supplied in said step of supplying also includes at least a portion of said information collected about said calls completed to the first location which they were routed.

7. The invention as defined in claim 6 further including the step of:

arranging information collected in each of said collecting steps into a predetermined format and it is said arranged information that is supplied in said step of supplying.

8. The invention as defined in claim 7 wherein said destination entity specifies at least a portion of the characteristics of said predetermined format.

9. The invention as defined in claim 8 wherein said information supplied is selected according to predetermined criteria specified at least in part by said destination entity.

10. A method for use in monitoring calls placed over a network of an interexchange carrier to destination entities, at least one of said destination entities having more than one location at which it can receive calls, the method being of the type in which information is collected about said calls and portions of said information relating to calls destined for particular destination entities are made available to those destination entities in a specified format, the improvement characterized by:

collecting information for those calls terminated before the performance of any network control point routing by said network of said interexchange carrier; and receiving from each respective one of said destination entities a specification of the format for making its portion of said information available.

11. The invention as defined in claim 10 wherein each format specification specifies the types of information that is made available to the destination entity from which said specification is received.

12. The invention as defined in claim 10 wherein said format specification specifies the appearance, as displayed, of the information that is made available to the destination entity from which said specification is received.

13. The invention as defined in claim 10 wherein said information collected about said calls further includes information for calls that were held in a queue by said interexchange carrier prior to having any routing performed by said interexchange carrier.

14. The invention as defined in claim 10 wherein said information collected about said calls further includes information about calls that were rerouted to at least one alternate location of said destination entity because said network of said interexchange carrier was unable to complete them to a first location to which they were initially routed.

15. A method for use in monitoring telephone calls placed to a destination entity via a network, the method comprising the steps of:

collecting information particularly relating to the queuing of a call in an network control point (NCP) of said network, said call having been (i) placed to said destination entity and (ii) having been held in a queue in said NCP prior to having any routing performed for said call; and supplying to said destination entity at least a portion of said information collected about said queued call.

16. A method for use in monitoring telephone calls placed to destination entity via a network of an interexchange carrier, the method comprising the steps of:

collecting information relating to a call placed to said destination entity, said call having been held in a queue in an network control point of said network, said collecting being prior to having any routing performed for said call; and supplying to said destination entity at least a portion of said information collected about said queued call.

17. A method for use by a call data processor to monitor telephone calls placed by callers to destination entities over a telephone network, said telephone network having an associated network control point, said network control point communicating with switches of said telephone network via the exchange of signaling messages of a predefined message set over a signaling network, the method comprising the steps of:

receiving information from said network control point about the treatment given to telephone calls placed over said telephone network to said destination entities, said information being undeterminable solely from any signaling messages suppliable to or from said network control point, or any combination thereof, without the use of data available only in said network control point; and supplying to said destination entities at least a portion of said information received from said network control point.

18. The invention as defined in claim 17 wherein said received information includes information about calls that are held in a queue prior to having any routing performed.

19. The invention as defined in claim 17 wherein said received information includes information relating to calls for which said network control point considered and rejected at least one location of said destination entity because it believed that an attempt to route a call to such a location would fail.

20. The invention as defined in claim 17 wherein said received information includes information relating to the alternate handling of calls placed to said destination entities because queues in said network control point, each associated with of said destination entities and into which said calls to their associated destination entities were to be temporarily placed, were full at a time when said calls were to be placed therein.

21. The invention as defined in claim 18 wherein said received information includes information relating to calls that said network control point predicted could be completed to a particular location of said destination entity but said telephone network was unable to so complete said calls.

22. The invention as defined in claim 19 wherein said received information includes information relating to calls that said network control point predicted could be completed to a particular location of said destination entity but said telephone network was unable to so complete said calls.

23. A method for use in supplying information about the treatment afforded calls placed over a network, said network employing at least one network control point for use is routing said calls, the method including a step of collecting information by a call data processor about said calls, the improvement characterized by:

in said collecting step information relating to the call treatment analysis of said network control point is collected.

24. The invention as defined in claim 23 further including the step of supplying said call treatment analysis information to at least one of said destination entities.

25. The invention as defined in claim 23 wherein said call treatment analysis information is collected by said call data processor directly from said network control point.

26. The invention as defined in claim 23 wherein said call treatment analysis information includes at least one of the following types of information: queue state information, alternate location sequence information, information concerning calls that were predicted by said network control points to be completable to a particular location but could not be so completed.

27. A method for use in monitoring call attempts processed by the network of an interexchange carrier in which the switches of said network route said call attempts in response to received instructions, the method characterized by the steps of:

collecting, at a call data processor of said interexchange carrier, information relating to call attempts placed to at least one destination entity prior to any routing of said call attempts by any of said switches; and periodically supplying to said destination entity, information relating to call attempts placed to said at least one destination entity as it is collected without waiting for the termination of said call attempts, said supplied information including at least a portion of said information collected in said collecting step and being formatted to convey in a single summary representation information about a plurality of said call attempts.

* * * * *